United States Patent
Wang et al.

(10) Patent No.: US 12,524,904 B2
(45) Date of Patent: Jan. 13, 2026

(54) MOBILE DEVICE POSITIONING METHOD AND POSITIONING APPARATUS

(71) Applicant: Huawei Technologies Co., Ltd., Guangdong (CN)

(72) Inventors: Huayou Wang, Beijing (CN); Changliang Xue, Shenzhen (CN); Yanhui Yu, Shenzhen (CN); Yanxing Zhou, Shenzhen (CN); Feng Wen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/124,354

(22) Filed: Mar. 21, 2023

(65) Prior Publication Data

US 2023/0222688 A1 Jul. 13, 2023

Related U.S. Application Data

(63) Continuation of application No. PCT/CN2021/099232, filed on Jun. 9, 2021.

(30) Foreign Application Priority Data

Sep. 22, 2020 (CN) .......................... 202011002221.4

(51) Int. Cl.
*G06T 7/73* (2017.01)
*G06V 10/98* (2022.01)

(52) U.S. Cl.
CPC ................ *G06T 7/73* (2017.01); *G06V 10/98* (2022.01)

(58) Field of Classification Search
CPC ............ G06T 7/73; G06T 2207/10016; G06T 2207/20084; G06T 2207/30244; G06V 10/98; G01C 21/005; G01C 21/20; B60W 40/02; B60W 50/00; B60W 2050/0043
USPC ......................................................... 382/103
See application file for complete search history.

(56) References Cited

FOREIGN PATENT DOCUMENTS

| CN | 101242530 | * | 8/2008 | |
|----|-----------|---|--------|---|
| CN | 109934847 | * | 5/2020 | |
| CN | 111476842 | * | 7/2020 | ............... G06T 7/73 |

* cited by examiner

*Primary Examiner* — Jerome Grant, II
(74) *Attorney, Agent, or Firm* — WOMBLE BOND DICKINSON (US) LLP

(57) ABSTRACT

A mobile device positioning method and a mobile device positioning apparatus are disclosed. Perception vector elements are associated with projection vector elements based on horizontal positions of the perception vector elements extracted from an image and horizontal positions of the projection vector elements obtained through projection of vector elements in a map. In this way, when the horizontal positions of the associated perception vector elements and the horizontal positions of the associated projection vector elements are separately arranged in a same order, horizontal position distribution of all the arranged perception vector elements is consistent with that of corresponding projection vector elements in the arranged projection vector elements, and pose estimation is performed on a mobile device based on an association result.

18 Claims, 7 Drawing Sheets

MOBILE DEVICE POSITIONING METHOD AND POSITIONING APPARATUS

CROSS-REFERENCE TO RELATED APPLICATIONS

This application is a continuation of International Application No. PCT/CN2021/099232, filed on Jun. 9, 2021, which claims priority to Chinese Patent Application No. 202011002221.4, filed on Sep. 22, 2020. The disclosures of the aforementioned applications are hereby incorporated by reference in their entireties.

TECHNICAL FIELD

This application relates to the field of intelligent driving, and more specifically, to a mobile device positioning method and positioning apparatus.

BACKGROUND

At present, an intelligent mobile device such as a self-driving car, an uncrewed aerial vehicle, and a robot has been widely used in various fields in life. A key technology of the intelligent mobile device is mainly realized through perceptual positioning, decision-making planning, and execution control. Perceptual positioning is a basis for running the intelligent mobile device.

Vector positioning is an effective method for the intelligent mobile device to perform perceptual positioning. Vector positioning means that the intelligent mobile device uses a sensor to capture an image of an ambient environment, extracts semantic information in the environment from the captured image, and expresses the extracted semantic information in a vector form to obtain a vector element; and then associates the vector element corresponding to the semantic information with a vector element extracted from a map, and estimates a system status vector of the intelligent mobile device based on the vector element corresponding to the semantic information and the vector element that is associated with the vector element corresponding to the semantic information and that is in the map, to implement perceptual positioning of the intelligent mobile device.

In the conventional technology, when the vector element corresponding to the semantic information is associated with the vector element extracted from the map, it is determined, based on a distance between the vector element corresponding to the semantic information and the vector element extracted from the map, whether to associate the vector element corresponding to the semantic information with the vector element extracted from the map. Specifically, a vector element that is in vector elements extracted from the map and that is closest to the vector element corresponding to the semantic information is associated with the vector element corresponding to the semantic information. This association manner easily causes a false association phenomenon, and consequently causes a large positioning error of the intelligent mobile device.

SUMMARY

This application provides a mobile device positioning method and positioning apparatus, to improve positioning accuracy.

According to a first aspect, this application provides a mobile device positioning method. The method includes: extracting N perception vector elements from a first image captured by an image capture apparatus of a mobile device, where N is a positive integer; projecting, based on a first particle pose of the mobile device, M' map vector elements in a map into an image coordinate system of the image capture apparatus, to obtain M first projection vector elements that are in a one-to-one correspondence with M map vector elements in the M' map vector elements, where M' is a positive integer, and M is a positive integer less than or equal to M'; obtaining an association result of the N perception vector elements and the M first projection vector elements, where the association result includes: when L perception vector elements in the N perception vector elements are one-to-one associated with L first projection vector elements in the M first projection vector elements, and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, L is an integer greater than 1, L is less than or equal to a minimum value of M and N, t is a positive integer less than L, and each of the L perception vector elements and a corresponding first projection vector element are vector elements of a same type; and performing pose estimation on the mobile device based on coordinates of each of the L perception vector elements, coordinates of the corresponding first projection vector element, and the first particle pose.

In the method provided in this application, when the projection vector element is associated with the perception vector element, horizontal coordinates of the associated perception vector elements are arranged in ascending order, and when the associated projection vector elements are arranged in ascending order, an order of each perception vector element is the same as an order of a projection vector element associated with each perception vector element, that is, horizontal position distribution of the perception vector element is consistent with that of the associated projection vector element. In this way, accuracy of association between the perception vector element and the projection vector element can be improved, and accuracy of association between the perception vector element and the map vector element is essentially improved, thereby improving accuracy of an estimated position.

In one embodiment, the performing pose estimation on the mobile device based on coordinates of each of the L perception vector elements, coordinates of the corresponding first projection vector element, and the first particle pose includes: determining position errors between the L perception vector elements and the corresponding L first projection vector elements based on a difference between a horizontal coordinate of each of the L perception vector elements and a horizontal coordinate of the corresponding first projection vector element; determining a weight of the first particle pose based on the position errors; and performing pose estimation on the mobile device based on the weight of the first particle pose and the first particle pose.

In this embodiment, pose estimation is performed on the mobile device based on the difference between the horizontal coordinate of the perception vector element and the horizontal coordinate of the associated projection vector element, to avoid a problem of inaccurate pose estimation caused by an additional error introduced by a plane assumption. In other words, this implementation can improve accuracy of pose estimation.

In one embodiment, the difference between the horizontal coordinate of each of the L perception vector elements and the horizontal coordinate of the corresponding first projection vector element, and the position errors meet the following relational expression:

$$\text{error} = \frac{1}{L}\sum_{t=1}^{L}\left|u'_t - u_t\right|,$$

where $u_t$ represents the horizontal coordinate of the $t^{th}$ perception vector element in the L perception vector elements, $u_t'$ represents the horizontal coordinate of the first projection vector element corresponding to the $t^{th}$ perception vector element, and error represents the position error.

In one embodiment, the obtaining an association result of the N perception vector elements and the M first projection vector elements includes: projecting, based on a second particle pose of the mobile device, the M' map vector elements into the image coordinate system, to obtain M second projection vector elements that are in a one-to-one correspondence with the M map vector elements in the M' map vector elements; respectively selecting L second projection vector elements and the L perception vector elements from the M second projection vector elements and the N perception vector elements, to meet the following relational expression, where the L second projection vector elements are one-to-one associated with the L perception vector elements:

$$\min\sum_{i=1}^{N}\sum_{j=1}^{M}\left\{e_{ij}x_{ij} + \omega\frac{1}{2N_i}\left(\sum_{k|x_k\in N_{x_i}\&\&p_k==1}d(y_j, y_{n_k}) + \sum_{k|y_k\in N_{y_j}}d(x_i, x_{m_k})\right)\right\}$$

$$\sum_{i=1}^{N}x_{ij} = 1$$

$$\sum_{j=1}^{M}x_{ij} \leq 1$$

$$x_{ij} = 0 \text{ or } 1$$

$$d(y_j, y_{n_k}) = \begin{cases} 0, n_k \in N_{y_j} \\ 1, m_k \notin N_{y_j} \end{cases}$$

$$d(x_i, x_{m_k}) = \begin{cases} 0, m_k \in N_{x_i} \\ 1, m_k \notin N_{x_i} \end{cases},$$

where $\omega$ is a preset value, $e_{ij}$ represents a difference between a horizontal coordinate of an $i^{th}$ perception vector element in the N perception vector elements and a horizontal coordinate of a $j^{th}$ second projection vector element in the M second projection vector elements, $x_{ij}$ represents whether the $i^{th}$ perception vector element is associated with the $j^{th}$ second projection vector element, $N_i$ represents a quantity of perception vector elements adjacent to the $i^{th}$ perception vector element in the N perception vector elements, $N_{x_i}$ represents a set of the perception vector elements adjacent to the $i^{th}$ perception vector element in the N perception vector elements, $x_k$ represents a $k^{th}$ perception vector element in the N perception vector elements, $p_k$ represents whether an associated second projection vector element has been found for the $k^{th}$ perception vector element, $n_k$ represents a second projection vector element that is in the M second projection vector elements and that matches the $k^{th}$ perception vector element, $d(y_j, y_{m_k})$ represents whether an adjacent relationship between the $i^{th}$ perception vector element and the $k^{th}$ perception vector element is the same as an adjacent relationship between the $j^{th}$ second projection vector element and the second projection vector element represented by $n_k$, $N_{y_j}$ represents a set of second projection vector elements that are in the M second projection vector elements and that are adjacent to the $j^{th}$ second projection vector element, $y_k$ represents a $k^{th}$ second projection vector element in the M second projection vector elements, $m_k$ represents a perception vector element that is in the N perception vector elements and that is associated with the $k^{th}$ second projection vector element, and $d(x_i, x_{m_k})$ represents whether an adjacent relationship between the $i^{th}$ second projection vector element and the $k^{th}$ second projection vector element is the same as an adjacent relationship between the $i^{th}$ perception vector element and the perception vector element represented by $m_k$; associating each of the L perception vector elements with a map vector element corresponding to an associated second projection vector element; and associating each of the L perception vector elements with a first projection vector element corresponding to the associated map vector element.

In embodiment, an approximate optimal association result between the perception vector element and a map vector element corresponding to another particle pose is used as an association result between the perception vector element and a map vector element corresponding to the first particle pose, and the perception vector element is associated with a projection vector element corresponding to the first particle pose based on the association result, so that association accuracy can be improved, thereby improving pose estimation accuracy.

In one embodiment, before the projecting, based on a second particle pose of the mobile device, the M' map vector elements into the image coordinate system, to obtain M second projection vector elements that are in a one-to-one correspondence with the M map vector elements in the M' map vector elements, the method further includes: projecting the M' map vector elements into the image coordinate system based on each of a plurality of particle poses of the mobile device, to obtain M projection map vector elements corresponding to each particle pose; associating the N perception vector elements with the M projection map vector elements corresponding to each of the plurality of particle poses, to obtain an association result corresponding to each particle pose, where an association result corresponding to an $s^{th}$ particle pose in the plurality of particle poses includes: when Ls projection vector elements in M projection map vector elements corresponding to the $s^{th}$ particle pose are one-to-one associated with Ls perception vector elements in the N perception vector elements, and a horizontal coordinate of an $h^{th}$ perception vector element in the Ls perception vector elements in the image coordinate system is less than a horizontal coordinate of an $(h+1)^{th}$ perception vector element in the Ls perception vector elements in the image coordinate system, a horizontal coordinate of a projection vector element associated with the $h^{th}$ perception vector element is less than a horizontal coordinate of a projection vector element associated with the $(h+1)^{th}$ perception vector element, and a difference between a horizontal coordinate of each of the Ls perception vector elements and a horizontal coordinate of an associated projection vector element is less than a preset threshold, where Ls is a positive integer less than or equal to M and less than or equal to N, and h is a positive integer less than Ls; calculating, based on the association result corresponding to each of the plurality of particle poses, projection errors between Ls projection vector elements corresponding to each particle pose and corresponding Ls perception vector elements, to obtain a plurality of projection errors that are in a one-to-one correspondence with the plurality of particle poses; and determining a particle pose corresponding to a smallest projection error in the plurality of projection errors as the second particle pose.

In this embodiment, for each particle pose, the perception vector element is associated with a projection vector element corresponding to the particle pose in a general association manner, a projection error is calculated based on an association result of each particle pose, and finally a particle pose with a smallest projection error is selected as the second particle pose. In this way, when the projection vector element corresponding to the first particle pose is associated based on an approximate optimal matching result of the second particle pose, association accuracy can be improved, and further pose estimation accuracy can be improved.

In one embodiment, the projection error corresponding to each particle pose is measured by a value of C in the following relational expression:

$$C = -\frac{1}{Ls}\sum_{i=1}^{Ls} e_i + \omega Ls,$$

where
- $\omega$ is a preset parameter, $e_i$ represents a difference between a horizontal coordinate of an $i^{th}$ projection vector element in the $L_s$ projection vector elements and a horizontal coordinate of an $i^{th}$ perception vector element in the $L_s$ perception vector elements, and a larger value of C indicates a smaller projection error corresponding to each particle pose.

In one embodiment, the method further includes: extracting X perception vector elements from a second image captured by the image capture apparatus, where X is a positive integer; and if a timestamp of the second image is after a timestamp of an image corresponding to a perception vector element used for last filtering observation update, performing pose estimation on the mobile device based on the X perception vector elements by using a filtering observation update method; or performing pose estimation on the mobile device based on the X perception vector elements by using a local pose map optimization method.

In this embodiment, a problem of asynchronous output of perception vector elements of different types in a same image and a problem of out-of-order that an output time of a perception vector element in an image with a previous timestamp is later than an output time of a perception vector element in the image with a later timestamp can be resolved, thereby improving accuracy of pose estimation.

In one embodiment, the obtaining an association result of the N perception vector elements and the M first projection vector elements includes: arranging the N perception vector elements in ascending order of horizontal coordinates, to obtain a first sequence; and performing the following operations for each perception vector element in the first sequence from the first perception vector element to the last perception vector element in the first sequence: searching the M first projection vector elements for a first projection vector element that is of a same type as each perception vector element, has a minimum difference between a horizontal coordinate of the first projection vector element and the horizontal coordinate of each perception vector element, has a difference, less than a specified threshold, between the horizontal coordinate of the first projection vector element and the horizontal coordinate of each perception vector element, and has a horizontal coordinate greater than a horizontal coordinate of a first projection vector element associated with a perception vector element before each perception vector element, and associating the found first projection vector element with each perception vector element.

According to a second aspect, this application provides a mobile device positioning apparatus. The apparatus may include modules configured to implement the method in the first aspect, and the modules may be implemented by using software and/or hardware.

According to a third aspect, this application provides a mobile device positioning apparatus. The apparatus includes a processor, configured to execute a program stored in a memory. When the program stored in the memory is executed, the processor is configured to implement the method in any implementation of the first aspect.

In one embodiment, the apparatus may further include the memory, where the memory is configured to store a program, and further, may be configured to store related data information in a positioning process.

In an example, the apparatus may be a chip, and the chip may further include a communication interface. For example, the apparatus may include a field programmable gate array (FPGA) or an application-specific integrated circuit (application-ASIC).

According to a fourth aspect, this application provides a computer-readable medium, where the computer-readable medium stores program code executed by a device, and the program code includes instructions used to perform the method in any implementation of the first aspect.

According to a fifth aspect, this application provides a computer program product including instructions. When the computer program product is run on a computer, the computer is enabled to perform the method in any implementation of the first aspect.

According to a sixth aspect, this application provides a mobile device. The mobile device may include the apparatus according to any one of the second aspect to the fifth aspect.

DESCRIPTION OF EMBODIMENTS

For ease of understanding, concepts in embodiments of this application are first described.

A mobile device means any device that can perform perceptual positioning based on data provided by a sensor. For example, the mobile device may include an intelligent driving vehicle, a robot, an airplane, or the like. The intelligent driving vehicle may include an unmanned vehicle, an intelligent assisted driving vehicle, or the like. The aircraft may include an uncrewed aerial vehicle, an intelligent assisted driving aircraft, or the like.

The sensor in embodiments of this application may include a global positioning system (GPS), a global navigation satellite system (GNSS), an inertial measurement unit (IMU), a visual-inertial navigation system (VINS), an inertial navigation system (INS), a graphics processing unit (GPU), a monocular camera, a wheel speedometer, and the like.

The data provided by the sensor may include a heading angle, a wheel velocity, an acceleration, an angular velocity, image information, and the like of the mobile device.

A vector element is semantic information represented in a vector form in a running environment of a mobile device. For example, the vector element may be a road edge, a lane line, a road surface identifier, a traffic light, a sign plate, a lamp pole, or the like.

Vector positioning is a positioning method in which a mobile device uses a sensor to associate a vector element extracted from a captured image with a vector element extracted from a map, and estimates a system status vector of the mobile device, to implement perceptual positioning of the mobile device.

Figure 1:
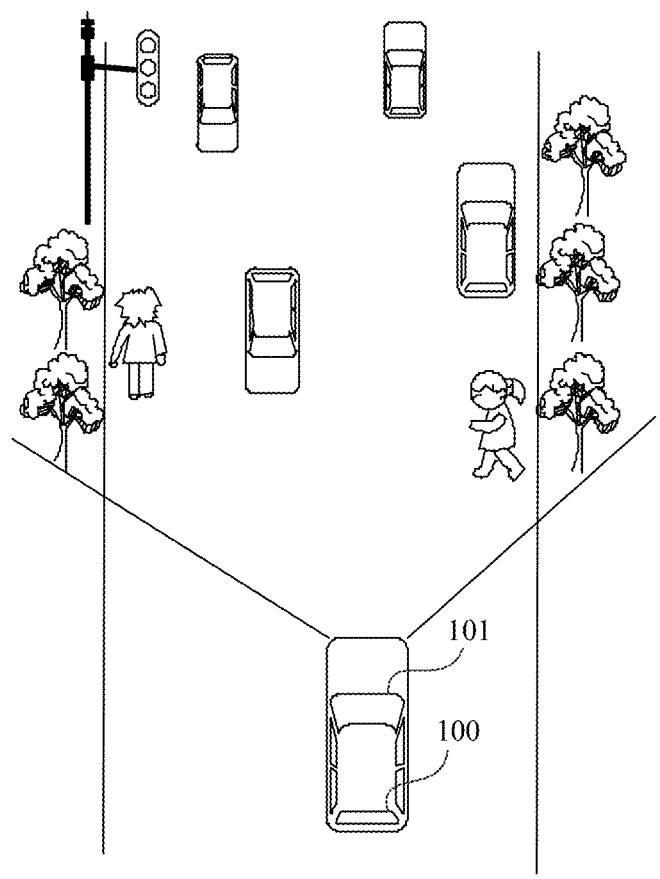
FIG. 1 is a schematic diagram of an application scenario according to an embodiment of this application.

FIG. 1 is a schematic diagram of an application scenario according to an embodiment of this application. The scenario shown in FIG. 1 is a scenario in which perceptual positioning is performed on an intelligent driving vehicle 100. A sensor 101 is configured to obtain data information of a self-driving vehicle in a driving process. For example, the sensor may include a GPS, a GNSS, an IMU, a VINS, an INS, a GPU, a monocular camera, a wheel speedometer, and the like.

It may be understood that the scenario in FIG. 1 is merely an example, and the technical solutions in this application may be further applied to another scenario provided that the scenario involves perceptual positioning of a mobile device. For example, the technical solutions in this application may be further applied to scenarios such as intelligent robot positioning and uncrewed aerial vehicle positioning.

In the scenario shown in FIG. 1, when perceptual positioning is performed on the intelligent driving vehicle, in an example, an odometer motion model may be constructed to update a particle pose, a weight of each particle pose is calculated by using an observation update operation in a particle filtering system, and a weighted average operation is performed on all particle poses based on the weight of each particle pose, to calculate a pose and a variance of the intelligent driving vehicle, or estimate a pose of the intelligent driving vehicle.

Figure 2:
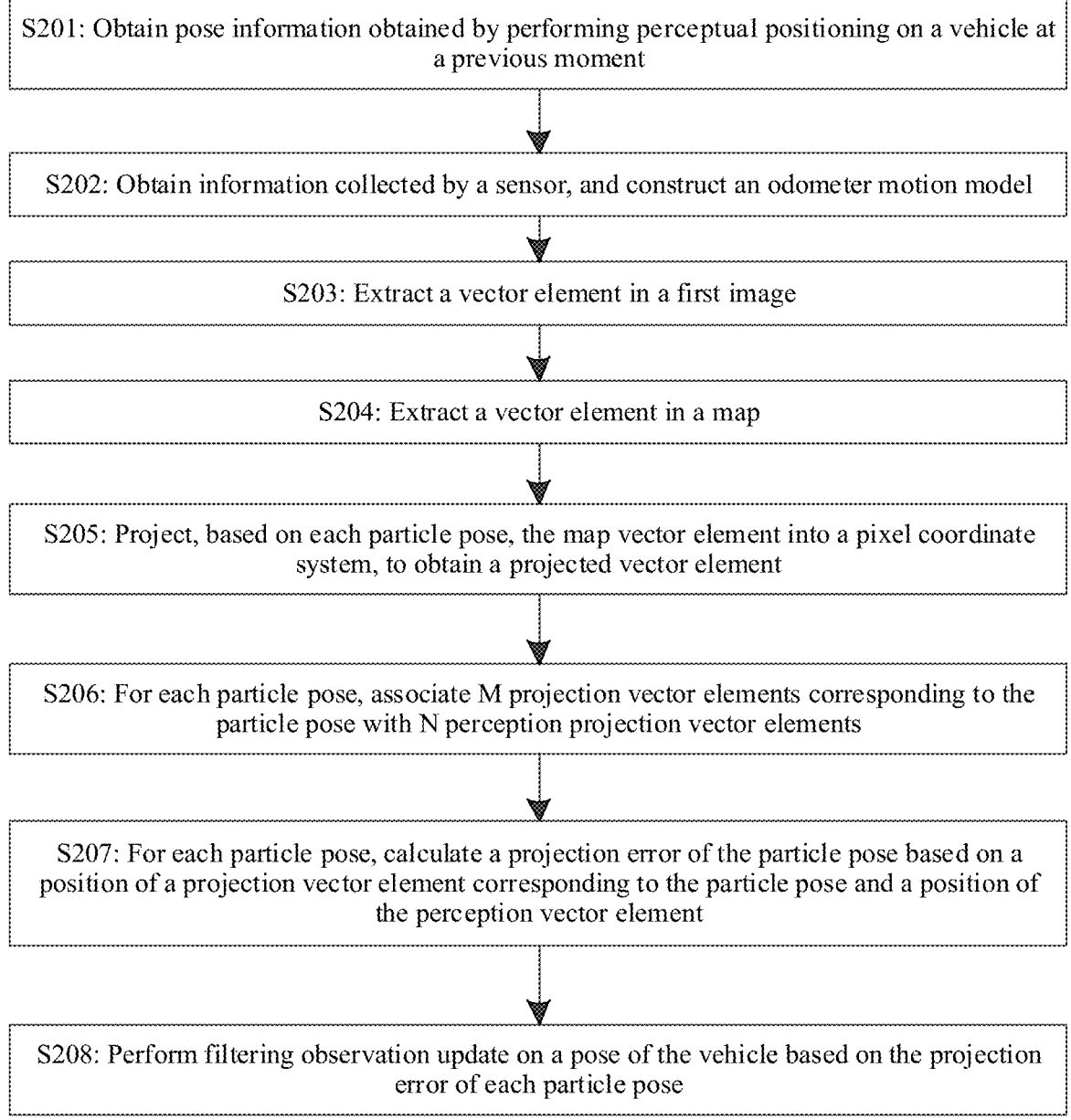
FIG. 2 is a schematic flowchart of a method for implementing perceptual positioning by an intelligent driving vehicle by using a particle filtering system.

FIG. 2 shows an example of a method for implementing perceptual positioning by the intelligent driving vehicle by using the particle filtering system. The following describes operations in FIG. 2. For ease of description, the intelligent driving vehicle is referred to as a vehicle for short in subsequent content. The method may be performed by an intelligent assisted driving system of the intelligent driving vehicle.

S201: Obtain pose information obtained by performing perceptual positioning on a vehicle at a previous moment. For ease of description, the previous moment is referred to as a moment k.

The pose information of the vehicle may include position information and posture information of the vehicle, and the posture information may include a heading angle.

When the previous moment is an initial moving moment of the vehicle, initial position information of the vehicle may be obtained by using a GNSS and/or an IMU on the vehicle.

S202: Obtain information collected by a sensor, and construct an odometer motion model.

The information collected by the sensor may include a wheel velocity, an acceleration, an angular velocity, an image including ambient environment information, and the like of the vehicle. For ease of description, the image is referred to as a first image. An example of the constructed odometer motion model is as follows:

$$\theta_{k+1} = \theta_k + \omega_k \Delta t_k + \delta$$

$$v_k^m = (v_k^l + v_k^r)/2$$

$$v_k^x = v_k^m \cos(\theta_k)$$

$$v_k^y = v_k^m \sin(\theta_k)$$

$$\hat{x}_{k+1} = x_k + v_k^x \Delta t_k + \delta$$

$$\hat{y}_{k+1} = y_k + v_k^y \Delta t_k + \delta, \text{ where}$$

$\Delta t_k$ is a time interval between the moment k and a moment k+1, the moment k+1 is a moment at which perceptual positioning is performed on the vehicle for the first time after the moment k, a predicted pose at the moment k+1 is denoted as $\hat{P}_{k+1}\{\hat{x}_{k+1}, \hat{y}_{k+1}, \hat{\theta}_{k+1}\}$. $\hat{x}_{k+1}, \hat{y}_{k+1}$ is a predicted two-dimensional position of the vehicle at the moment k+1 in a world coordinate system, $\hat{\theta}_{k+1}$ is a predicted heading angle of the vehicle at the moment k+1 in the world coordinate system, a predicted pose at the moment k is denoted as $P_k\{x_k, y_k, \theta_k\}$, $x_k, y_k$ is a predicted two-dimensional position of the vehicle at the moment k in the world coordinate system, $\theta_k$ is a predicted heading angle of the vehicle at the moment k in the world coordinate system, $\omega_k$ is an angular velocity of the vehicle at the moment k, $v_k^l$ is a wheel velocity of a left wheel of the vehicle at the moment k, $v_k^r$ is a wheel velocity of a right wheel of the vehicle at the moment k, $v_k^m$ is an average wheel velocity of the vehicle at the moment k, $v_k^x$ is a wheel velocity of the vehicle in a horizontal direction at the moment k, $v_k^y$ is a wheel velocity of the vehicle in a vertical direction at the moment k, and $\delta$ represents a noise error.

For each of a plurality of particle poses of the vehicle, the predicted pose at the moment k+1 may be obtained by using the foregoing odometer motion model.

When the moment k is an initial moment of the vehicle, the plurality of particle poses may be particle poses collected around the vehicle based on an initial pose of the vehicle.

S203: Extract a vector element in the first image.

For ease of description, in this embodiment, a vector element extracted from an image is referred to as a perception vector element, and a perception vector element extracted from the first image is referred to as a first perception vector element. In this embodiment, a quantity of perception vector elements extracted from the first image is denoted as N, where N is a positive integer.

In this embodiment, the extracting the perception vector element from the first image may include: determining pixel position information and an element type of each perception vector element. The pixel position information of the perception vector element may include pixel coordinates of a center point of a visual frame of the perception vector element in an image coordinate system, and a length and a width of the visual frame. The element type of the perception vector element may include a road edge, a lane line, a road surface identifier, a traffic light, a sign plate, a lamp pole, or the like.

S204: Extract a vector element in a map.

The map in this embodiment may be an electronic map of an area in which the vehicle is located, for example, a high-definition map. For example, the map may be an electronic map of an area such as a city or a district in which the vehicle is located. For ease of description, in this embodiment, the vector element extracted from the map is referred to as a map vector element.

When the vector element is extracted from the map, in an example, a vector element that is within a preset range in front of a specified pose of the vehicle may be extracted from the map. In this embodiment, a quantity of map vector elements extracted from the map is denoted as M', where M' is a positive integer. The specified pose may be a pose obtained by performing weighted averaging calculation on a plurality of positions obtained through processing by using the odometer motion model in S202

The extracting the map vector element from the map may include: determining position information and an element type of each map vector element from the map. The position information of the map vector element may be a position of the map vector element in the world coordinate system. The element type of the map vector element may be a road edge, a lane line, a road surface identifier, a traffic light, a sign plate, a lamp pole, or the like.

In a possible implementation, the preset range may be set based on experience. For example, if the preset range is set to 100 meters, a map vector element within 100 meters in front of the vehicle may be extracted from the map.

In another possible implementation, the preset range may be a sensing distance of an image capture apparatus, that is, a distance between an object in the first image captured by the image capture apparatus and the vehicle. For example, if the sensing distance of the image capture apparatus is 80 meters, a map vector element within 80 meters in front of the vehicle may be extracted from the map.

S205: Project, based on each particle pose, the map vector element into a pixel coordinate system, to obtain a projected vector element. In this embodiment, the vector element obtained through projection of the map vector element is referred to as a projection vector element.

The projecting the map vector element based on each particle pose may be understood as protecting the map vector element based on each of particle poses of the vehicle at the moment k+1.

For example, for each particle pose at the moment k+1, M map vector elements in the M' map vector elements are projected into the pixel coordinate system, to obtain M projection vector elements corresponding to the particle pose. M is a positive integer less than or equal to M', and the M projection vector elements are in a one-to-one correspondence with the M map vector elements.

It may be understood that, for different particle poses, quantities of map vector elements that have corresponding projection vector elements in the pixel coordinate system and that are in the M' map vector elements may be the same, or may be different. In other words, values of M corresponding to different particle poses may be the same, or may be different.

The projecting the map vector element into the pixel coordinate system to obtain the corresponding projection vector element may be understood as transforming a position of an object corresponding to the map vector element in the world coordinate system, to obtain a position of the object in the pixel coordinate system, that is, pixel coordinates of the object in the pixel coordinate system. The position of the object in the pixel coordinate system and the element type of the map vector element may form a projection vector element corresponding to the map vector element.

A position of the projection vector element in the pixel coordinate system and a position of the map vector element in the world coordinate system meet the following relational expression:

$$p_i = \frac{1}{Z_i^c} K T c_v T T_v P_i^m,$$

where $P_i$ is a position of an $i^{th}$ projection vector element in the pixel coordinate system, $P_i^m$ is a position of an $i^{th}$ map vector element in the world coordinate system; $T_v$ represents a matrix expression form of a first particle pose, and T in the upper right corner represents a matrix rotation operation; $T_v^c$ represents a transformation relationship between a vehicle coordinate system and a camera coordinate system, that is, an extrinsic parameter of a camera; K represents an intrinsic parameter of the camera; and $Z_i^c$ represents a coordinate of an $i^{th}$ vector element converted to a z-axis of the camera coordinate system. The intrinsic parameter and the extrinsic parameter of the camera can be obtained through camera calibration.

If one of the plurality of particle poses of the vehicle is referred to as a first particle pose, M map vector elements in the M' map vector elements are projected into the pixel coordinate system based on the first particle pose, to obtain M projection vector elements. The M projection vector elements are in a one-to-one correspondence with the M map vector elements. In this embodiment, the M projection vector elements corresponding to the first particle pose are referred to as M first projection vector elements.

S206: For each particle pose, associate M projection vector elements corresponding to the particle pose with N perception vector elements.

A manner of associating the projection vector element with the perception projection vector element includes: performing association based on a distance between the perception vector element and the projection vector element. Specifically, for each perception vector element, a distance between pixel coordinates of the perception vector element and pixel coordinates of each projection vector element having a same element type is calculated, and a projection vector element corresponding to a minimum distance is associated with the perception vector element.

S207: For each particle pose, calculate a projection error of the particle pose based on a position of a projection vector element corresponding to the particle pose and a position of the perception vector element.

For example, for each particle pose, assuming that L projection vector elements in the M projection vector elements corresponding to the particle pose are associated with L perception vector elements in the N perception vector elements, a projection error of the particle pose is calculated based on a distance between each of the L projection vector elements and a corresponding perception vector element in the L perception vector elements.

In an example, the distance between each of the L projection vector elements corresponding to each particle pose and the corresponding perception vector element in the L perception vector elements and the projection error of the particle pose meet the following relational expression:

$$\text{error} = \frac{1}{L}\sum_{t=1}^{L}|\Delta u_t|$$

$\Delta u_t$ represents a distance between a $t^{th}$ perception vector element in the L perception vector elements and a corresponding projection vector element, error represents a projection error, and "||" represents calculating an absolute value.

S208: Perform filtering observation update on a pose of the vehicle based on the projection error of each particle pose. For example, a weight of an $i^{th}$ particle pose at the moment k+1 is calculated by using a normalized Gaussian model:

$$\omega_{k+1}^i = e^{-\frac{1}{2}\frac{(error_i - \mu)^2}{\sigma^2}}$$

$$\omega_{k+1}^i = \alpha\omega_{k+1}^i + (1-\alpha)\omega_k^i,$$

where
$\omega_{k+1}^i$ represents a weight of the $i^{th}$ particle pose at the moment k+1, $\omega_k^i$ represents a weight of the $i^{th}$ particle pose at the moment k, $\mu$ represents an average value of perception errors, and is generally set to 0; $\sigma^2$ represents a variance of the perception errors; $\alpha$ represents a confidence parameter of weights of the particle at a previous moment and a current moment, that is, a confidence parameter of weights at the moment k and the moment k+1, and $error_i$ represents a projection error of the $i^{th}$ particle pose. $\mu$ and $\sigma^2$ may be values obtained through counting based on a projection error between a historical perception vector element and projection vector data of a corresponding real map vector element.

After a weight of each particle pose is obtained, weighted averaging is performed on all particle poses, to obtain a pose estimation $\{x_{k+1}, y_{k+1}, \theta_{k+1}\}$ and a variance of the vehicle at the moment k+1:

$$x_{k+1} = \sum_{i=1}^{n}\omega_{k+1}^i x_{k+1}^i$$

$$y_{k+1} = \sum_{i=1}^{n}\omega_{k+1}^i y_{k+1}^i$$

$$\theta_{k+1} = \sum_{i=1}^{n}\omega_{k+1}^i \theta_{k+1}^i \text{ or}$$

$$\sin\theta_{k+1} = \sum_{i=1}^{n}\omega_{k+1}^i \sin\theta_{k+1}^i$$

$$\cos\theta_{k+1} = \sum_{i=1}^{n}\omega_{k+1}^i \cos\theta_{k+1}^i$$

$$\theta_{k+1} = \tan^{-1}(\sin\theta_{k+1}/\cos\theta_{k+1}),$$

where
$\{x_{k+1}^i, y_{k+1}^i, \theta_{k+1}^i\}$ represents an $i^{th}$ particle pose in n particle poses, that is, a two-dimensional position and a heading angle in the world coordinate system; and $\omega_{k+1}^i$ represents a weight of the $i^{th}$ particle pose at the moment k+1, and n is a quantity of particle poses.

A variance corresponding to the estimation pose $\{x_{k+1}, y_{k+1}, \theta_{k+1}\}$ includes:

$$\sigma_{k+1,x}^2 = \sum_{i=1}^{n}\omega_{k+1}^i(x_{k+1} - x_{k+1}^i)^2$$

$$\sigma_{k+1,y}^2 = \sum_{i=1}^{n}\omega_{k+1}^i(y_{k+1} - y_{k+1}^i)^2$$

$$\sigma_{k+1,\theta}^2 = \sum_{i=1}^{n}\omega_{k+1}^i(\theta_{k+1} - \theta_{k+1}^i)^2,$$

where
$\omega_{k+1}$ represents a weight of the $i^{th}$ particle pose at the moment k+1, and n is a quantity of particle poses.

After an observation update pose and the variance at the moment k+1 are obtained, it may be determined whether to perform resampling. The conditions for determining whether to perform resampling are as follows:

$$N_{eff} = \frac{1}{\sum_{i=1}^{n}(\omega_{k+1}^i)^2} < \frac{n}{2},$$

where
$\omega_{k+1}^i$ represents a weight of the $i^{th}$ particle pose at the moment k+1, and n is a quantity of particle poses. If $$N_{eff} < \frac{n}{2},$$

resampling is performed; otherwise, resampling may not be performed.

During resampling, an example method is adaptive resampling. To be specific, 10% particle poses with large weights are reserved, 10% new particle poses are generated near the pose at the moment k+1, and remaining 80% particle poses are randomly selected from an original particle set. In this way, n particle poses updated at the moment k+1 can be obtained.

Figure 3:
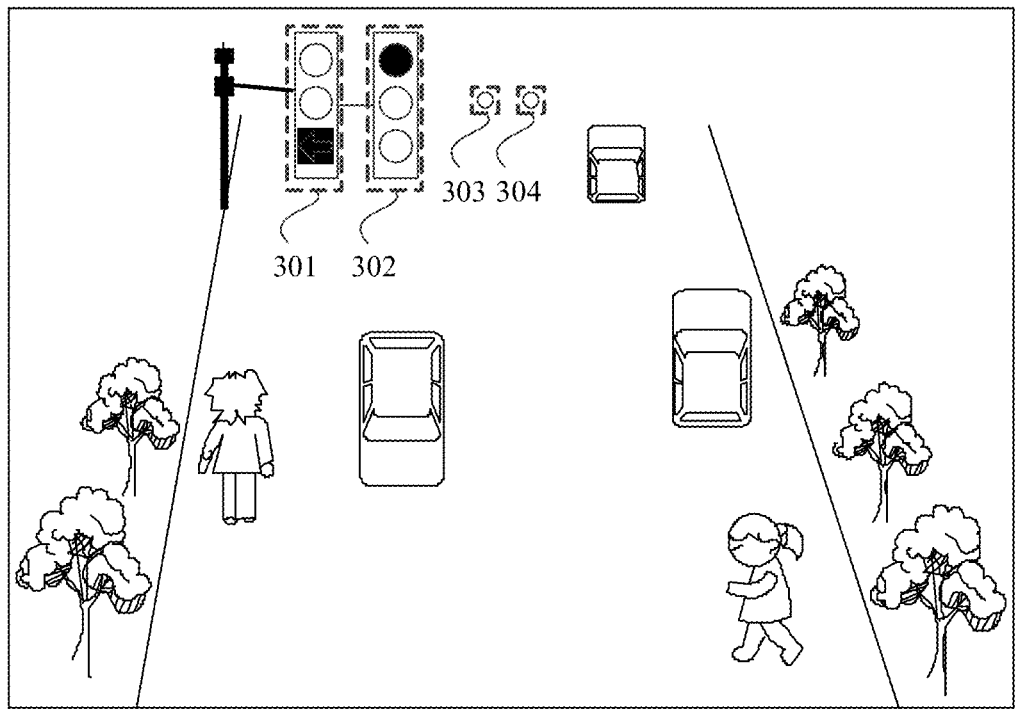
FIG. 3 is a schematic diagram of data association according to an embodiment of this application.

In the method shown in FIG. 2, when the perception vector element is associated with the projection vector element, a projection vector element that is closest to the perception vector element is associated with the perception vector element. This easily causes a false association phenomenon. For example, as shown in FIG. 3, by using the method shown in FIG. 2, two perception vector elements 301 and 302 that are in a one-to-one correspondence with two signal lights are associated with a left projection vector element 303 in the two projection vector elements 303 and 304, but actually, the right perception vector element 302 should be associated with the right projection vector element 304.

For the foregoing problem that an association error is easily caused because the perception vector element that is closest to the projection vector element is associated with the projection vector element, and consequently a pose estimation error is caused, this application provides a data association method. In the method, when the perception vector element is associated with the projection vector element, association is performed based on horizontal position consistency of the projection vector element and the perception vector element. The horizontal position consistency means that the projection vector element and the associated perception vector element have a same element type, and horizontal position distribution of associated perception vector elements is consistent with that of corresponding projection vector elements.

For example, when the N perception vector elements are associated with the M first projection vector elements, if L perception vector elements in the N perception vector elements are one-to-one associated with L projection vector elements in the M projection vector elements, a horizontal coordinate of a $t^{th}$ perception vector element in the L perception vector elements in an image coordinate system is less than a horizontal coordinate of a $(t+1)^{th}$ perception vector element in the L perception vector elements in the image coordinate system. When a horizontal coordinate of a projection vector element corresponding to the $t^{th}$ perception vector element is less than a horizontal coordinate of a projection vector element corresponding to the $(t+1)^{th}$ perception vector element, and an element type of the $t^{th}$ perception vector element is the same as that of the corresponding projection vector element, it may be considered that horizontal position distribution of the L perception vector elements is consistent with that of the L perception vector elements. L is an integer greater than 1, L is less than or equal to a minimum value of M and N, and t is a positive integer less than L.

According to the method in this application, accuracy of association between the perception vector element and the projection vector element can be improved, and a false association phenomenon can be reduced.

In some possible implementations, a difference between a horizontal coordinate of each of the L perception vector elements and a horizontal coordinate of a corresponding projection vector element should be less than a preset threshold. In this way, association accuracy can be further ensured, and positioning accuracy can be improved.

According to the vector element association method provided in this application, association between the perception vector element 301 and the projection vector element 303 shown in FIG. 3 can be implemented, and association between the perception vector element 302 and the projection vector element 304 can be implemented, thereby improving association accuracy and further improving positioning accuracy.

Figure 4:
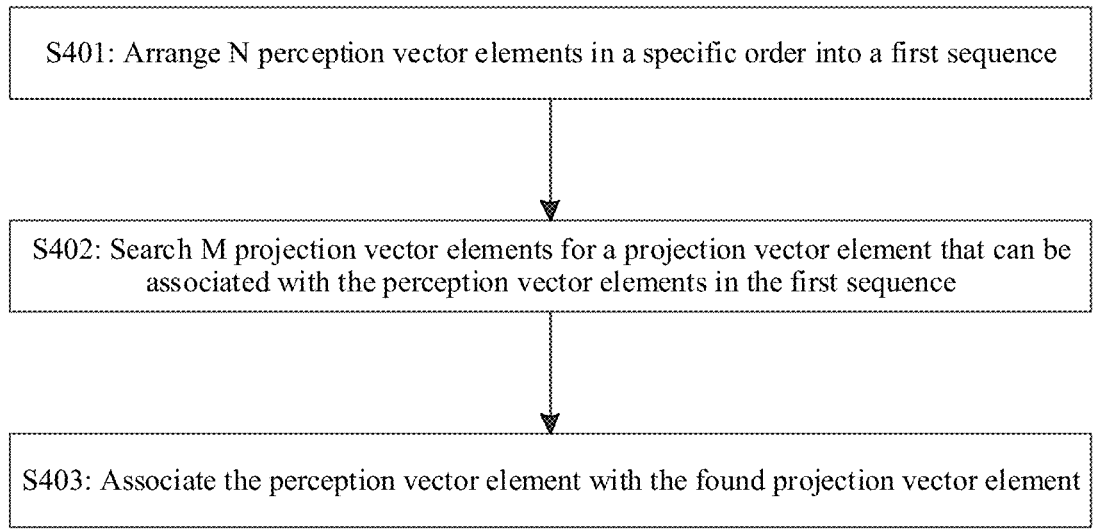
FIG. 4 is a schematic flowchart of a data association method according to an embodiment of this application.

The following first describes a data association method provided in an embodiment of this application with reference to the accompanying drawings. FIG. 4 is a schematic flowchart of a data association method according to an embodiment of this application. As shown in FIG. 4, the method includes the following operations:

S401: Arrange N perception vector elements in a specific order into a first sequence.

For example, the N perception vector elements are arranged in ascending order of horizontal coordinates, to obtain a first sequence.

For another example, the N perception vector elements are arranged in descending order of horizontal coordinates, to obtain a first sequence.

S402: Search M projection vector elements for a projection vector element that can be associated with the perception vector elements in the first sequence.

In some possible implementations, the following operations may be performed for each perception vector element in the first sequence from the first perception vector element to the last perception vector element in the first sequence: searching the M projection vector elements for a projection vector element that is of a same type as the perception vector element, has a minimum difference between a horizontal coordinate of the projection vector element and a horizontal coordinate of the perception vector element, has a difference, less than a specified threshold, between the horizontal coordinate of the projection vector element and the horizontal coordinate of the perception vector element, has a difference, less than a threshold, between a vertical coordinate of the projection vector element and a vertical coordinate of the perception vector element, and has a horizontal coordinate greater than a horizontal coordinate of a projection vector element associated with a perception vector element before the perception vector element.

In an example, the M projection vector elements may be arranged in a specific order into a second sequence, and an arrangement order of projection vector elements in the second sequence may be the same as that of the perception vector elements in the first sequence. For example, the projection vector elements in the second sequence are arranged in ascending order of horizontal coordinates. Then, from the first perception vector element to the last perception vector element in the first sequence, the following operations are performed for each perception vector element in the first sequence: starting from a first projection vector element that has not been found in the second sequence, searching for a projection vector element that is of a same type as the perception vector element, has a minimum difference between a horizontal coordinate of the projection vector element and a horizontal coordinate of the perception vector element, has a difference, less than a specified threshold, between the horizontal coordinate of the projection vector element and the horizontal coordinate of the perception vector element, has a difference, less than a specified threshold, between a vertical coordinate of the projection vector element and a vertical coordinate of the perception vector element, and has a horizontal coordinate greater than a horizontal coordinate of a projection vector element associated with a perception vector element before the perception vector element.

For example, the M projection vector elements are searched for a projection vector element that is of a same type as a second perception vector element in the first sequence, has a minimum difference between a horizontal coordinate of the projection vector element and a horizontal coordinate of the second perception vector element, where the minimum difference is less than 50 pixels, has a difference between a vertical coordinate of the projection vector element and a vertical coordinate of the second perception vector element, where the difference is less than 100 pixels, and has a horizontal coordinate greater than a horizontal coordinate of a projection vector element associated with the first perception vector element.

S403: Associate the perception vector element with the found projection vector element.

In this embodiment of this application, an association result of the N perception vector elements and the M projection vector elements meets horizontal position consistency, so that accuracy of association between the perception vector element and the projection vector element can be improved, and false association can be reduced.

Further, the difference between the horizontal coordinate of each perception vector element and the horizontal coordinate of the associated projection vector element is less than the preset threshold, so that accuracy of association between the perception vector element and the projection vector element can be further improved, and false association can be further reduced.

Further, the difference between the vertical coordinate of each perception vector element and the vertical coordinate of the associated projection vector element is less than the preset threshold, so that accuracy of association between the perception vector element and the projection vector element can be further improved, and false association can be further reduced.

Figure 5:
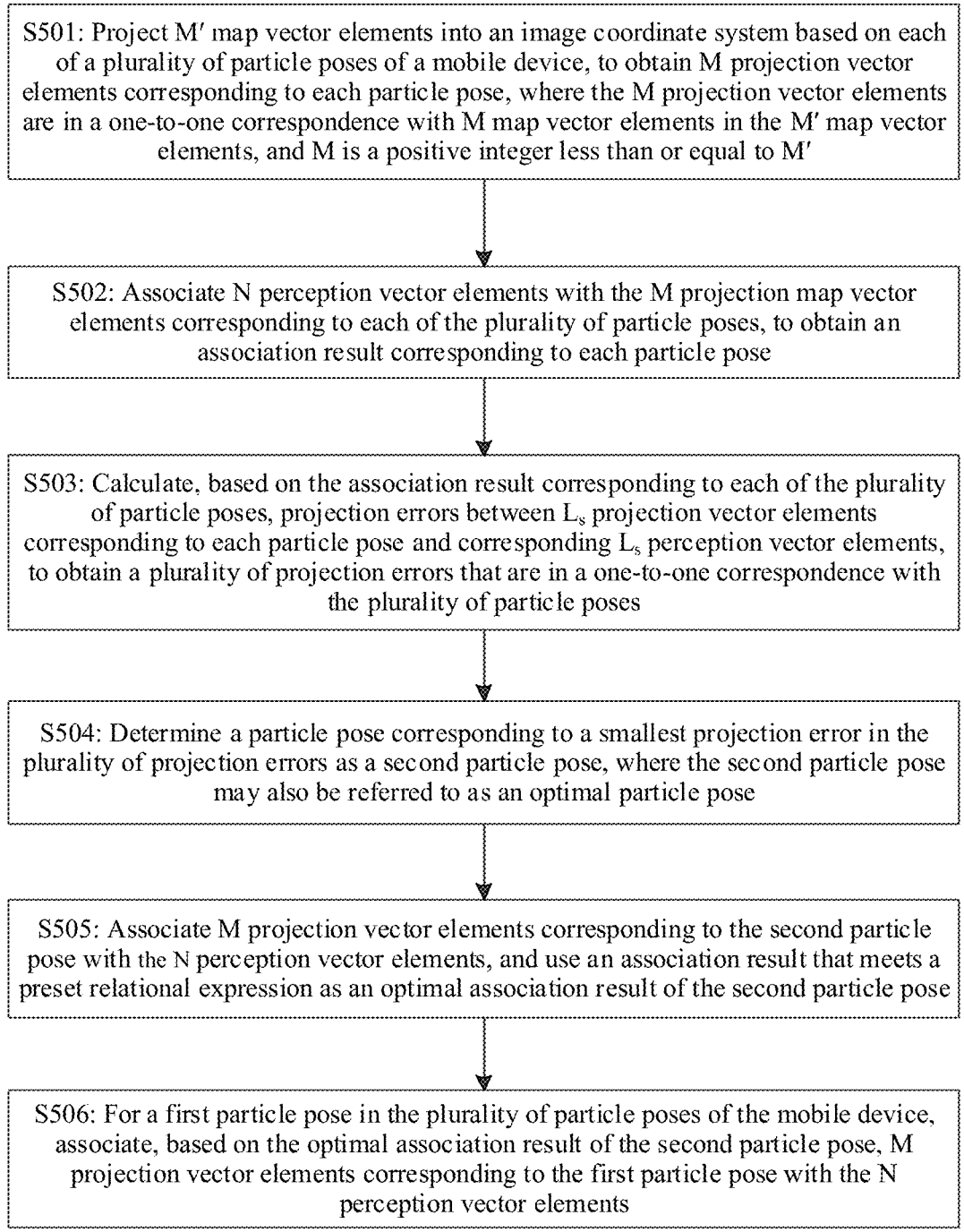
FIG. 5 is a schematic flowchart of another data association method according to an embodiment of this application.

FIG. 5 is a schematic flowchart of another data association method according to an embodiment of this application. As shown in FIG. 5, the method may include the following operations.

S501: Project M' map vector elements into an image coordinate system based on each of a plurality of particle poses of a mobile device, to obtain M projection vector elements corresponding to each particle pose, where the M projection vector elements are in a one-to-one correspondence with M map vector elements in the M' map vector elements, and M is a positive integer less than or equal to M'.

It may be understood that, for different particle poses, quantities of map vector elements that have corresponding projection vector elements in the pixel coordinate system and that are in the M' map vector elements may be the same, or may be different. In other words, values of M corresponding to different particle poses may be the same, or may be different.

S502: Associate N perception vector elements with the M projection map vector elements corresponding to each of the plurality of particle poses, to obtain an association result corresponding to each particle pose.

For an association method for associating the N perception vector elements with the M projection map vector elements corresponding to each particle pose, refer to the method shown in FIG. 4.

For example, an association result corresponding to a $5^{th}$ particle pose may include: when eight projection vector elements in 10 projection map vector elements corresponding to the $5^{th}$ particle pose are one-to-one associated with eight perception vector elements in 12 perception vector elements, and a horizontal coordinate of a $3^{rd}$ perception vector element in the eight perception vector elements in the image coordinate system is less than a horizontal coordinate of a $4^{th}$ perception vector element in the eight perception vector elements in the image coordinate system, a horizontal coordinate of a projection vector element associated with the $3^{rd}$ perception vector element is less than a horizontal coordinate of a projection vector element associated with the $4^{th}$ perception vector element, and a difference between a horizontal coordinate of each of the eight perception vector elements and a horizontal coordinate of an associated projection vector element is less than 50 pixels, and a difference between a vertical coordinate of each of the eight perception vector elements and a vertical coordinate of the associated projection vector element is less than 100 pixels.

S503: Calculate, based on the association result corresponding to each of the plurality of particle poses, projection errors between $L_s$ projection vector elements corresponding to each particle pose and corresponding $L_s$ perception vector elements, to obtain a plurality of projection errors that are in a one-to-one correspondence with the plurality of particle poses.

In a possible implementation, for the $L_s$ projection vector elements corresponding to each particle pose and the corresponding $L_s$ perception vector elements, C corresponding to each particle pose may be calculated by using the following relational expression:

$$C = -\frac{1}{L_s}\sum_{i=1}^{L_s} e_i + \omega L_s,$$

where
ω is a preset parameter, $e_i$ represents a difference between a horizontal coordinate of an $i^{th}$ projection vector element in the $L_s$ projection vector elements and a horizontal coordinate of an $i^{th}$ perception vector element in the $L_s$ perception vector elements, and C represents a weighted evaluation value of an average position error and a matching quantity corresponding to each particle pose.

Then, a projection error corresponding to each example pose may be measured by using C. For example, a larger value of C indicates a larger projection error of a corresponding particle pose.

It may be understood that the foregoing relational expression is merely an example, and any relational expression obtained by transforming the foregoing relational expression falls within the protection scope of embodiments of this application.

S504: Determine a particle pose corresponding to a smallest projection error in the plurality of projection errors as a second particle pose. The second particle pose may also be referred to as an approximate optimal matching particle pose.

For example, a particle pose corresponding to a maximum value of C may be selected as the second particle pose, and a particle pose corresponding to the maximum value of C is selected as the approximate optimal matching particle pose.

S505: Associate M projection vector elements corresponding to the second particle pose with the N perception vector elements, and use an association result that meets a preset relational expression as an optimal association result of the second particle pose.

In a possible implementation, the preset relationship is as follows:

$$\min\sum_{i=1}^{N}\sum_{j=1}^{M}\left\{e_{ij}x_{ij} + \omega\frac{1}{2N_i}\left(\sum_{k|x_k \in N_{x_i} \&\& p_k == 1} d(y_j, y_{n_k}) + \sum_{k|y_k \in N_{y_j}} d(x_i, x_{m_k})\right)\right\}$$

$$\sum_{i=1}^{N} x_{ij} = 1$$

-continued $$\sum_{j=1}^{M} x_{ij} \leq 1$$

$$x_{ij} = 0 \text{ or } 1$$

$$d(y_j, y_{n_k}) = \begin{cases} 0, n_k \in N_{y_j} \\ 1, n_k \notin N_{y_j} \end{cases}$$

$$d(x_i, x_{m_k}) = \begin{cases} 0, m_k \in N_{x_i} \\ 1, m_k \notin N_{x_i} \end{cases},$$

where

ω is a preset value, $e_{ij}$ represents a difference between a horizontal coordinate of a $i^{th}$ perception vector element in the N perception vector elements and a horizontal coordinate of a $j^{th}$ projection vector element in the M projection vector elements corresponding to the second particle pose, $x_{ij}$ represents whether the $i^{th}$ perception vector element is associated with the $j^{th}$ projection vector element, $N_i$ represents a quantity of perception vector elements adjacent to the $i^{th}$ perception vector element in the N perception vector elements, $N_{x_i}$ represents a set of the perception vector elements adjacent to the $i^{th}$ perception vector element in the N perception vector elements, $x_k$ represents a $k^{th}$ perception vector element in the N perception vector elements, $p_k$ represents whether an associated projection vector element has been found for the $k^{th}$ perception vector element, $n_k$ represents a projection vector element that is in the M projection vector elements and that matches the $k^{th}$ perception vector element, $d(y_j, y_{n_k})$ represents whether an adjacent relationship between the $i^{th}$ perception vector element and the $k^{th}$ perception vector element is the same as an adjacent relationship between the $j^{th}$ projection vector element and the projection vector element represented by $n_k$, $N_{y_j}$ represents a set of projection vector elements that are in the M projection vector elements and that are adjacent to the $j^{th}$ projection vector element, $y_k$ represents a $k^{th}$ projection vector element in the M projection vector elements, $m_k$ represents a perception vector element that is in the N perception vector elements and that is associated with the $k^{th}$ projection vector element, and $d(x_i, x_{m_k})$ represents whether an adjacent relationship between the $j^{th}$ projection vector element and the $k^{th}$ projection vector element is the same as an adjacent relationship between the $i^{th}$ perception vector element and the perception vector element represented by $m_k$.

S506: For a first particle pose in the plurality of particle poses of the mobile device, associate, based on the optimal association result of the second particle pose, M projection vector elements corresponding to the first particle pose with the N perception vector elements. The first particle pose may be any particle pose other than the second particle pose in the plurality of particle poses.

For example, the projection vector element corresponding to the second particle pose is referred to as a second projection vector element, and the projection vector element corresponding to the first particle pose is referred to as a first projection vector element. Then, a map vector element corresponding to each second projection vector element in the optimal association result is associated with the second projection vector element based on the optimal association result of the second particle pose, and a first projection vector element that is in the M first projection vector elements corresponding to the first particle pose and that is corresponding to the map vector element is associated with a perception vector element associated with the second projection vector element, so that an association result corresponding to the first particle pose may be finally obtained.

According to the data association method provided in this embodiment of this application, an optimal second particle pose is first determined, then the optimal association result of the second particle pose is determined, and finally an association result of another particle pose is obtained based on the optimal association result of the second particle pose. This can improve accuracy of association results of all particle poses, thereby improving positioning precision of the mobile device.

According to the method for determining the second particle pose provided in this embodiment of this application, weighted averaging operation, or the like is performed on the association result obtained by each particle pose, to obtain a position error corresponding to each particle pose. A particle pose corresponding to a minimum position error is determined as the second particle pose, thereby improving accuracy of determining the second particle pose.

It may be understood that in the foregoing embodiment, selecting the optimal particle position from the plurality of particle poses as the second particle pose is merely an example. In another embodiment of this application, the second particle pose may be selected from the plurality of particle poses in another manner. For example, the second particle pose may be randomly selected from the plurality of particle poses, or a particle pose with a maximum weight may be used as the second particle pose.

Further, this application further provides a positioning method based on any one of the foregoing data association methods. According to the positioning method provided in this application, accuracy of pose estimation can be improved because there are a small quantity of false-association phenomena.

Figure 6:
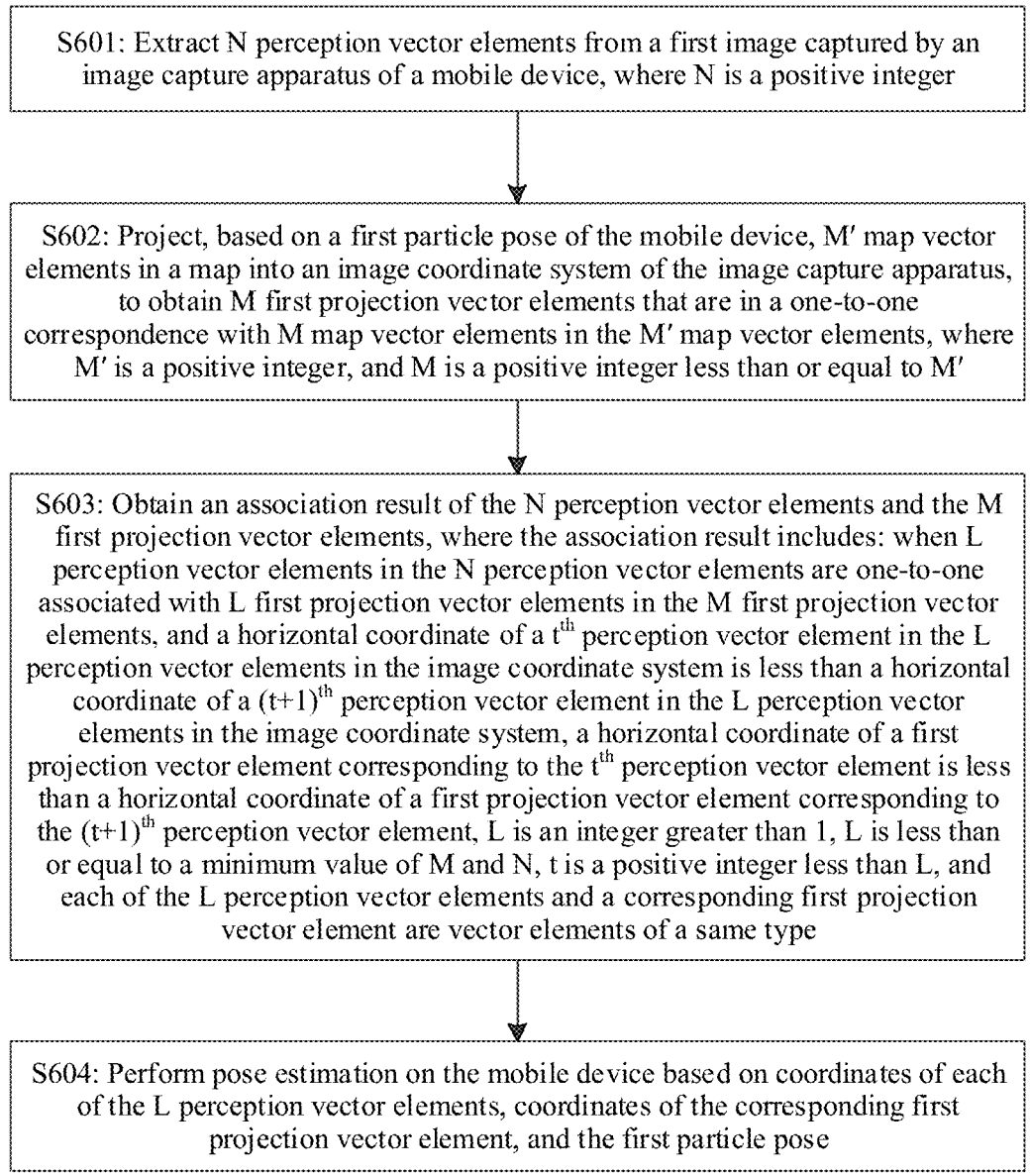
FIG. 6 is a schematic flowchart of a mobile device positioning method according to an embodiment of this application.

FIG. 6 is a schematic flowchart of a mobile device positioning method according to an embodiment of this application. As shown in FIG. 6, the method may include the following operations.

S601: Extract N perception vector elements from a first image captured by an image capture apparatus of a mobile device, where N is a positive integer.

The first image may include different types of perception vector elements, and the different types of perception vector elements may be extracted by using different neural networks.

In some possible implementations, the image capture apparatus of the mobile device may be a monocular camera, a binocular camera, or a depth camera. All the three image capture apparatuses can collect an image within a specific distance in front of the mobile device, and the binocular camera and the depth camera can further provide distance information of the image.

For example, the monocular camera has a simple structure and a low cost, and can obtain only one picture at a same time. A vector element in the picture is extracted to reflect a three-dimensional scenario in a two-dimensional form.

For example, the binocular camera includes two monocular cameras, and may obtain two pictures at a same time. A distance (which may also be referred to as a baseline) between the two monocular cameras is known, and a spatial position of each pixel is estimated by using the baseline. A larger baseline distance indicates a larger measurement range. The binocular camera uses a GPU and a field programmable gate array (FPGA) device to output distance information of the image in real time.

For example, the depth camera may measure a distance between an object and the camera by using infrared structured light or a time of flight principle (ToF).

S602: Project, based on a first particle pose of the mobile device, M' map vector elements in a map into an image coordinate system of the image capture apparatus, to obtain M first projection vector elements that are in a one-to-one correspondence with M map vector elements in the M' map vector elements, where M' is a positive integer, and M is a positive integer less than or equal to M'.

The mobile device may have a plurality of particle poses, and the first particle pose is any particle pose in the plurality of particle poses. The M map vector elements may be all or some map vector elements extracted from all map vector elements within a preset range of the mobile device in a high-definition electronic map.

For a same map vector element in the M map vector elements, each first particle pose has one projection vector element corresponding to the map vector element. In this embodiment, the projection vector element corresponding to the first particle pose is referred to as a first projection vector element.

S603: Obtain an association result of the N perception vector elements and the M first projection vector elements, where the association result includes: when L perception vector elements in the N perception vector elements are one-to-one associated with L first projection vector elements in the M first projection vector elements, and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, L is an integer greater than 1, L is less than or equal to a minimum value of M and N, t is a positive integer less than L, and each of the L perception vector elements and a corresponding first projection vector element are vector elements of a same type.

In this embodiment, not all of the obtained N perception vector elements can find first projection vector elements associated with the perception vector elements. Likewise, not all of the obtained M first projection vector elements can find perception vector elements associated with the first projection vector elements. At most L perception vector elements can be associated with the L first projection vector elements, where L is a positive integer greater than 1 and less than or equal to a minimum value of M and N.

For example, the mobile device obtains eight perception vector elements and 10 first projection vector elements from the first image and the map, and at most eight perception vector elements are associated with the eight first projection vector elements.

For another example, the mobile device obtains six perception vector elements and five first projection vector elements from the first image and the map, and at most five perception vector elements are associated with the five first projection vector elements.

S604: Perform pose estimation on the mobile device based on coordinates of each of the L perception vector elements, coordinates of the corresponding first projection vector element, and the first particle pose.

For example, a filtering update system may be used to calculate a weight of the first particle pose based on coordinates of each of the L perception vector elements and coordinates of a corresponding first projection vector element, and perform pose estimation on the mobile device based on the weight and the first particle pose.

In a possible implementation, pose estimation is performed on the mobile device based on the first particle pose and a difference between a horizontal coordinate of each of the L perception vector elements and a horizontal coordinate of a corresponding first projection vector element.

In another possible implementation, pose estimation is performed on the mobile device based on the first particle pose and a distance between coordinates of each of the L perception vector elements and coordinates of a corresponding first projection vector element.

In still another possible implementation, pose estimation is performed on the mobile device based on the first particle pose and a difference between a vertical coordinate of each of the L perception vector elements and a vertical coordinate of a corresponding first projection vector element.

In this implementation, when pose estimation is performed on the mobile device based on the coordinates of each of the L perception vector elements, the coordinates of the corresponding first projection vector element, and the first particle pose, the difference between the horizontal coordinate of each perception vector element and the horizontal coordinate of the corresponding first projection vector element may be used as a projection error between the two vector elements, a reprojection horizontal error observation model of the mobile device is constructed based on the projection error, then the weight of the first particle pose is calculated based on the observation model, and then pose estimation is performed on the mobile device based on the first particle pose and the weight of the first particle pose.

Figure 7:
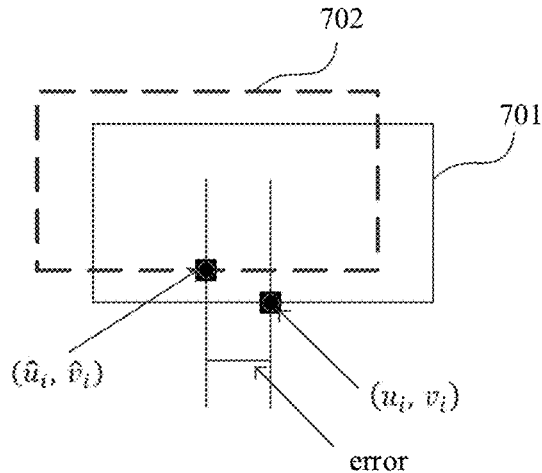
FIG. 7 is a schematic diagram of a projection error of a vector element according to an embodiment of this application.

FIG. 7 is a schematic diagram of a projection error of a vector element. As shown in FIG. 7, 701 is a perception vector element, pixel coordinates of a center point of the perception vector element are $(u_i, v_i)$, 702 is a first projection vector element corresponding to 701, and pixel coordinates of a center point of the perception vector element are $(\hat{u}_i, \hat{v}_i)$. In this case, an example of a reprojection horizontal error observation model is:

$$\text{error} = \frac{1}{L}\sum_{i=1}^{L}|\hat{u}_i - u_i|,$$

where
$u_i$ indicates a horizontal coordinate of the perception vector element, $v_i$ indicates a vertical coordinate of the perception vector element, $\hat{u}_i$ indicates a horizontal coordinate of the first projection vector element, $\hat{v}_1$ indicates a vertical coordinate of the first projection vector element, L is a quantity of perception vector elements, and error indicates a horizontal error between the perception vector element and the first projection vector element.

In an implementation of this embodiment, for an implementation of calculating the weight of the first particle pose based on the observation model, and then performing pose estimation on the mobile device based on the first particle pose and the weight of the first particle pose, refer to related content in S207. Details are not described herein again.

In this embodiment of this application, an association result of the N perception vector elements and the M first projection vector elements meets horizontal position consistency, so that accuracy of association between the perception vector element and the first projection vector element can be improved, and false association can be reduced.

In a possible implementation of this embodiment, a difference between a horizontal coordinate of each of the L perception vector elements and a horizontal coordinate of a corresponding first projection vector element is less than a preset threshold, and a difference between a vertical coordinate of each perception vector element and a vertical coordinate of a corresponding first projection vector element is less than a preset threshold. The preset threshold that is less than by the difference between the horizontal coordinate of each perception vector element and the horizontal coordinate of the corresponding first projection vector element, and the preset threshold that is less than by the difference between the vertical coordinate of each perception vector element and the vertical coordinate of the corresponding first projection vector element may be set according to experience.

For example, the mobile device obtains eight perception vector elements and 10 first projection vector elements from the first image and the map, and six of the eight perception vector elements are associated with six first projection vector elements. When a horizontal coordinate of a $2^{nd}$ perception vector element in the six perception vector elements in the image coordinate system is less than a horizontal coordinate of a $3^{rd}$ perception vector element in the six perception vector elements in the image coordinate system, a horizontal coordinate of a first projection vector element corresponding to the $2^{nd}$ perception vector element is less than a horizontal coordinate of a first projection vector element corresponding to the $3^{rd}$ perception vector element, a difference between a horizontal coordinate of each of the six perception vector elements and a horizontal coordinate of a corresponding first projection vector element is less than 50 pixels, a difference between a vertical coordinate of each of the six perception vector elements and a vertical coordinate of a corresponding first projection vector element is less than 100 pixels, and each of the six perception vector elements and a corresponding first projection vector element are vector elements of a same type.

In this implementation, because the difference between the horizontal coordinate of each perception vector element and the horizontal coordinate of the associated first projection vector element should be small enough, accuracy of associating the perception vector element with the first projection vector element can be further improved, and false association can be reduced.

In the method for positioning the mobile device by using the particle filtering system in the filtering observation update method, a problem of multi-vector asynchronous output is not considered, and therefore a positioning error is large. For example, when pose estimation is performed at the moment k+1, because it takes a long time for a neural network to extract a specific type of vector element in an image, a time for the neural network to output this type of vector element is later than the moment k+1, and perception vector elements used for pose estimation does not include this type of vector element. Consequently, a small quantity of vector elements are used as a reference for pose estimation, thereby affecting accuracy of pose estimation.

To resolve the foregoing problem, an embodiment of this application provides a positioning method that combines filtering observation update and local pose map optimization. A timestamp of each captured image is determined, to determine whether to perform a filtering observation update process or a local pose map optimization process. According to the positioning method provided in this embodiment, a problem of low positioning precision caused by the asynchronous multi-vector element output can be resolved. In other words, the positioning method provided in this embodiment can improve positioning accuracy.

Figure 8:
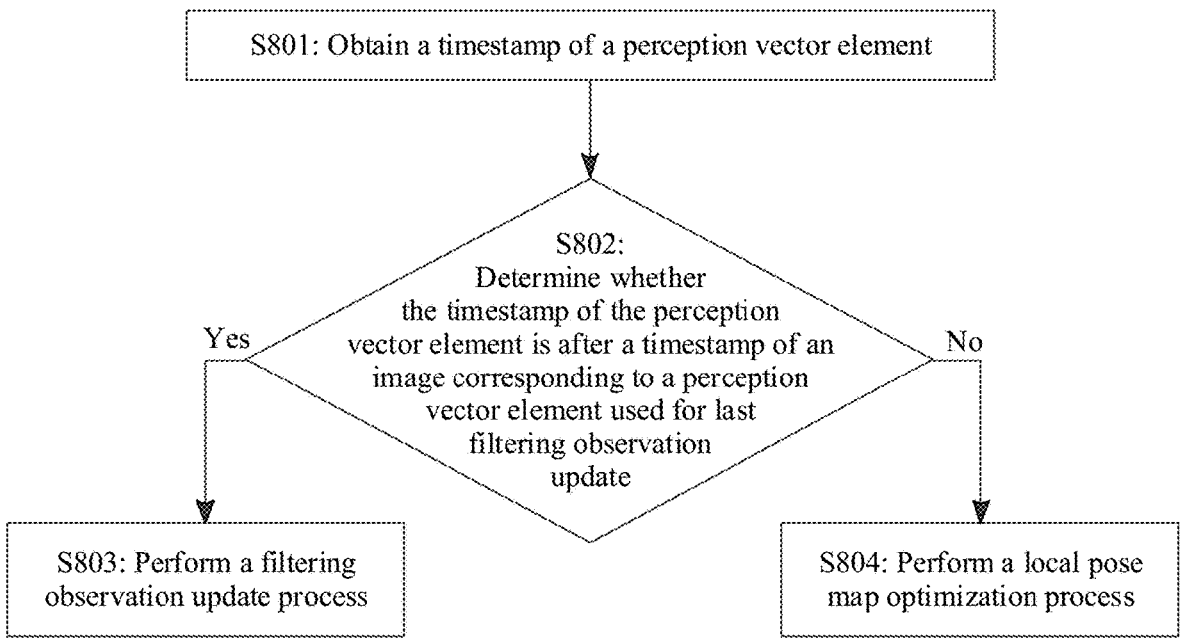
FIG. 8 is a schematic flowchart of a positioning method that combines filtering observation update and local pose map optimization according to an embodiment of this application.

With reference to the accompanying drawings, the following describes a positioning method that combines filtering observation update and local pose map optimization provided in embodiments of this application. FIG. 8 is a schematic flowchart of a positioning method that combines filtering observation update and local pose map optimization according to an embodiment of this application. As shown in FIG. 8, the method may include the following operations.

S801: Obtain a timestamp of a perception vector element.

In an example, if the perception vector element is extracted from a first image, a timestamp of the first image may be used as the timestamp of the perception vector element. If the perception vector element is extracted from a second image, a timestamp of the second image may be used as the timestamp of the perception vector element.

In one embodiment, the timestamp of the first image and the timestamp of the second image may be respectively a capture time of the first image and a capture time of the second image. For example, the timestamp of the first image is 10:30:05 on Sep. 1, 2020, and the timestamp of the second image is 10:32:21 on Sep. 1, 2020.

S802: Determine whether the timestamp of the perception vector element is after a timestamp of an image corresponding to a perception vector element used for last filtering observation update; and if yes, perform S803; otherwise, perform S804.

For example, it is assumed that the timestamp of the perception vector element used for the last filtering observation update is 10:32:18 on Sep. 1, 2020, and a timestamp of a currently obtained perception vector element is after 10:32:18 on Sep. 1, 2020, S803 is performed; otherwise, S804 is performed.

S803: Perform a filtering observation update process.

For a specific implementation of filtering observation update, refer to related operations in the method shown in FIG. 2 or FIG. 6. Details are not described herein again.

S804: Perform a local pose map optimization process.

The local pose map optimization process refers to performing pose optimization on a vector factor in a current sliding window, and updating a motion estimation result of a current odometer by optimizing pose estimation in the sliding window.

In an implementation of a process of performing local pose map optimization at a moment k, a vector factor $e_k^l$ and an odometer factor $e_k^o$ at the moment k are first constructed as follows:

$$e_k^l(T_k, P^l, z_k^l) = |\hat{u}_k^l - u_k^l|$$

$$e_k^o(T_k, T_{k+1}, Z_{k,k+1}^o) = (T_{k+1}^{-1} T_k) Z_{k,k+1}^o, \text{ where}$$

$\hat{u}_k^l$ indicates a horizontal position of a signpost reprojected into an image pixel coordinate system at the moment k; $u_k^l$ indicates a horizontal pixel coordinate position of a perception vector element at the moment k; $Z_{k,k+1}^o$ indicates pose change estimation of an odometer from the moment k to a moment k+1; and $T_k$ and $T_{k+1}$ respectively indicate matrix forms of a parking space pose at the moment k and a parking space pose at the moment k+1:

$$T_k = \begin{bmatrix} \cos\theta_k & \sin\theta_k & x_k \\ -\sin\theta_k & \cos\theta_k & y_k \\ 0 & 0 & 1 \end{bmatrix}$$

$$T_{k+1} = \begin{bmatrix} \cos\theta_{k+1} & \sin\theta_{k+1} & x_{k+1} \\ -\sin\theta_{k+1} & \cos\theta_{k+1} & y_{k+1} \\ 0 & 0 & 1 \end{bmatrix}$$

Then, the constructed vector factor and the odometer factor are inserted into the sliding window, and the following target function is constructed:

$$\min_{\chi} \sum_k e_k^o(T_k, T_{k+1}, Z_{k,k+1}^o)^T \Omega_k^o e_k^o(T_k, T_{k+1}, Z_{k,k+1}^o) +$$

$$\sum_k e_k^l(T_k, P^l, z_k^l)^T \Omega_k^l e_k^l(T_k, P^l, z_k^l),$$

where
- $\chi$ represents all to-be-optimized poses in the sliding window; $\Omega_k^o$ represents a covariance matrix of the odometer factor; and $\Omega_k^l$ represents a covariance matrix of the vector factor. Then, a nonlinear least squares objective function is optimized effectively by using the Lavenberg-Marquilt method, to obtain an optimized pose. The optimized pose is used to update a pose recursive estimation result of the odometer.

According to the method that combines the filtering observation update and the local pose map optimization provided in this embodiment of this application, whether to perform the filtering observation update process or the local pose map optimization process is determined based on a size of the timestamp of the image, thereby reducing a calculation amount, reducing an accumulated error, resolving a multi-vector asynchronous output problem, ensuring that a pose of a self-driving vehicle is output in real time, and improving positioning accuracy.

This application further provides apparatuses corresponding to the methods in the foregoing embodiments. For example, the apparatus provided in this application may include function modules configured to implement the method shown in FIG. 4, FIG. 5, or FIG. 6, to implement a corresponding method.

Figure 9:
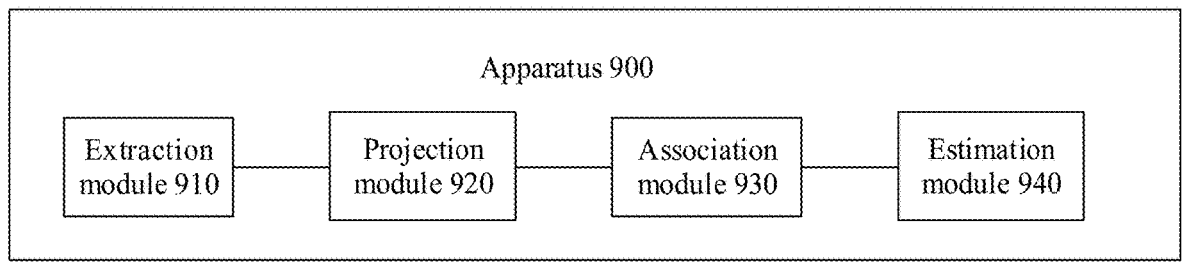
FIG. 9 is a schematic diagram of a structure of an apparatus according to an embodiment of this application.

FIG. 9 is a schematic block diagram of a positioning apparatus 900 according to an embodiment of this application. It should be understood that the positioning apparatus 900 shown in FIG. 9 is merely an example, and the apparatus 900 in this embodiment of this application may further include other modules or units.

For example, the apparatus 900 may include an extraction module 910, a projection module 920, an association module 930, and an estimation module 940. The extraction module 910 is configured to perform S601, the projection module 920 is configured to perform S602, the association module 930 is configured to perform S603, and the estimation module 940 is configured to perform S604.

It should be understood that the apparatus 900 herein is presented in a form of a functional module. The term "module" herein may be implemented in a form of software and/or hardware. This is not specifically limited. For example, the "module" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions.

In an example in which the extraction module 910 is implemented in a software form, the extraction module 910 may include a neural network model configured to extract various types of vector elements from an image. In an example in which the extraction module 910 is implemented in a software form and a hardware form, the extraction module 910 may include a neural network model configured to extract various types of vector elements from an image and a neural network processor.

Figure 10:
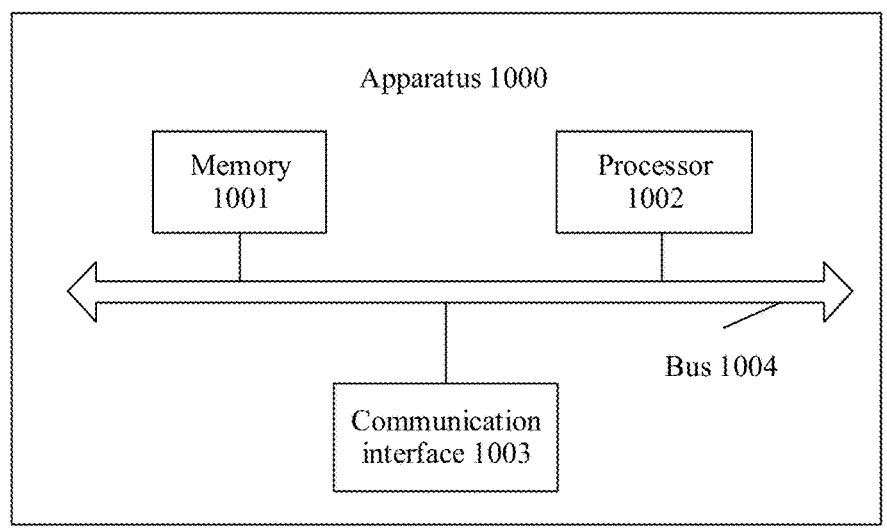
FIG. 10 is a schematic diagram of a structure of another apparatus according to an embodiment of this application.

FIG. 10 is a schematic block diagram of a positioning apparatus 1000 according to an embodiment of this application. The apparatus 1000 shown in FIG. 10 includes a memory 1001, a processor 1002, a communication interface 1003, and a bus 1004. The memory 1001, the processor 1002, and the communication interface 1003 are communicatively connected to each other through the bus 1004.

The memory 1001 may be a read only memory (ROM), a static storage device, a dynamic storage device, or a random access memory (RAM). The memory 1001 may store a program. When the program stored in the memory 1001 is executed by the processor 1002, the processor 1002 is configured to perform operations of the method shown in FIG. 4, FIG. 5, or FIG. 6.

The processor 1002 may be a general-purpose central processing unit (CPU), a microprocessor, an application-specific integrated circuit (ASIC), or one or more integrated circuits. The processor 1002 is configured to execute a related program, to implement the methods in embodiments of this application.

Alternatively, the processor 1002 may be an integrated circuit chip, and has a signal processing capability. In an implementation process, the operations of the method in embodiments of this application may be completed by using a hardware integrated logic circuit in the processor 1002 or instructions in a form of software.

Alternatively, the processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like.

Operations of the methods disclosed with reference to embodiments of this application may be directly executed and accomplished through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information from the memory 1001, and completes, in combination with hardware of the processor 1002, functions that need to be performed by units included in the apparatuses in this application. For example, the processor 1002 may perform operations/functions in embodiments shown in FIG. 4, FIG. 5, or FIG. 6.

The communication interface 1003 may use, but not limited to, a transceiver apparatus of a transceiver type, to implement communication between the apparatus 1000 and another device or a communication network.

The bus 1004 may include a path for transmitting information between the components (for example, the memory 1001, the processor 1002, and the communication interface 1003) of the apparatus 1000.

It should be understood that the apparatus 1000 shown in this embodiment of this application may be an electronic device, or may be a chip configured in an electronic device.

It should be understood that, the processor in embodiments of this application may be a central processing unit (CPU). The processor may be further another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of positioning a mobile device, comprising:
   extracting N perception vector elements from a first image captured by an image capture apparatus of the mobile device, wherein N is a positive integer;
   projecting, based on a first particle pose of the mobile device, M' map vector elements in a map into an image coordinate system of the image capture apparatus, to obtain M first projection vector elements that are in a one-to-one correspondence with M map vector elements in the M' map vector elements, wherein M' is a positive integer, and wherein M is a positive integer less than or equal to M';
   determining an association result of the N perception vector elements and the M first projection vector elements, the association result comprising: when L perception vector elements in the N perception vector elements are one-to-one associated with L first projection vector elements in the M first projection vector elements and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, wherein L is an integer greater than 1, wherein L is less than or equal to a minimum value of M and N, wherein t is a positive integer less than L, and wherein each L perception vector element of the L perception vector elements and a corresponding first projection vector element are vector elements of a same type; and
   performing pose estimation on the mobile device based on coordinates of each L perception vector element of the L perception vector elements and the corresponding first projection vector element, and the first particle pose.

2. The method according to claim 1, wherein the performing pose estimation on the mobile device based on coordinates of each L perception vector element of the L perception vector elements and the corresponding first projection vector element, and the first particle pose comprises:
   determining position errors between the L perception vector elements and the corresponding L first projection vector elements based on a difference between a horizontal coordinate of each L perception vector element of the L perception vector elements and the corresponding first projection vector element;
   determining a weight of the first particle pose based on the position errors; and
   performing pose estimation on the mobile device based on the weight of the first particle pose and the first particle pose.

3. The method according to claim 2, wherein the difference between the horizontal coordinate of each of the L perception vector elements and the corresponding first projection vector element and the position errors meet following relational expression:

$$\text{error} = \frac{1}{L}\sum_{i=1}^{L} |u'_t - u_t|,$$

$u_t$ represents the horizontal coordinate of the $t^{th}$ perception vector element in the L perception vector elements, wherein $u_t'$ represents the horizontal coordinate of the first projection vector element corresponding to the $t^{th}$ perception vector element, and wherein error represents the position error.

4. The method according to claim 1 wherein the determining the association result of the N perception vector elements and the M first projection vector elements comprises:
   projecting, based on a second particle pose of the mobile device, the M' map vector elements into the image coordinate system, to obtain M second projection vector elements that are in a one-to-one correspondence with the M map vector elements in the M' map vector elements;
   respectively selecting L second projection vector elements and the L perception vector elements from the M second projection vector elements and the N perception vector elements, to meet following relational expression, wherein the L second projection vector elements are one-to-one associated with the L perception vector elements:

$$\min \sum_{i=1}^{N}\sum_{j=1}^{M}\left\{e_{ij}x_{ij} + \omega\frac{1}{2N_i}\left(\sum_{k|x_k \in N_{x_i} \&\& p_k = 1} d(y_j, y_{n_k}) + \sum_{k|y_k \in N_{y_j}} d(x_i, x_{m_k})\right)\right\}$$

$$\sum_{i=1}^{N} x_{ij} = 1$$

$$\sum_{j=1}^{M} x_{ij} \leq 1$$

$$x_{ij} = 0 \text{ or } 1$$

$$d(y_j, y_{n_k}) = \begin{cases} 0, n_k \in N_{y_j} \\ 1, n_k \notin N_{y_j} \end{cases}$$

-continued $$d(x_i, x_{m_k}) = \begin{cases} 0, m_k \in N_{x_i} \\ 1, m_k \notin N_{x_i} \end{cases},$$

wherein
wherein ω is a preset value, $e_{ij}$ represents a difference between a horizontal coordinate of an $i^{th}$ perception vector element in the N perception vector elements and a horizontal coordinate of a $j^{th}$ second projection vector element in the M second projection vector elements, wherein $x_{ij}$ represents whether the $i^{th}$ perception vector element is associated with the $j^{th}$ second projection vector element, wherein $N_i$ represents a quantity of perception vector elements adjacent to the $i^{th}$ perception vector element in the N perception vector elements, wherein $N_{x_i}$ represents a set of the perception vector elements adjacent to the $i^{th}$ perception vector element in the N perception vector elements, wherein $x_k$ represents a $k^{th}$ perception vector element in the N perception vector elements, wherein $P_k$ represents whether an associated second projection vector element has been found for the $k^{th}$ perception vector element, wherein $n_k$ represents a second projection vector element that is in the M second projection vector elements and that matches the $k^{th}$ perception vector element, wherein $d(y_j, y_{n_k})$ represents whether an adjacent relationship between the $i^{th}$ perception vector element and the $k^{th}$ perception vector element is the same as an adjacent relationship between the $j^{th}$ second projection vector element and the second projection vector element represented by $n_k$, wherein $N_{y_j}$ represents a set of second projection vector elements that are in the M second projection vector elements and that are adjacent to the $j^{th}$ second projection vector element, wherein $y_k$ represents a $k^{th}$ second projection vector element in the M second projection vector elements, $m_k$ represents a perception vector element that is in the N perception vector elements and that is associated with the $k^{th}$ second projection vector element, and wherein $d(x_i, x_{m_k})$ represents whether an adjacent relationship between the $j^{th}$ second projection vector element and the $k^{th}$ second projection vector element is the same as an adjacent relationship between the $i^{th}$ perception vector element and the perception vector element represented by $m_k$;
associating each L perception vector element of the L perception vector elements with a map vector element corresponding to an associated second projection vector element; and
associating each L perception vector element of the L perception vector elements with a first projection vector element corresponding to the associated map vector element.

5. The method according to claim 4, wherein before the projecting, based on a second particle pose of the mobile device, the M' map vector elements into the image coordinate system, to obtain M second projection vector elements that are in a one-to-one correspondence with the M map vector elements in the M' map vector elements, the method further comprises:
projecting the M' map vector elements into the image coordinate system based on each particle pose of a plurality of particle poses of the mobile device, to obtain M projection map vector elements corresponding to each particle pose;
associating the N perception vector elements with the M projection map vector elements corresponding to each of the plurality of particle poses, to obtain an association result corresponding to each particle pose, an association result corresponding to an $s^{th}$ particle pose in the plurality of particle poses comprising: when Ls projection vector elements in M projection map vector elements corresponding to the $s^{th}$ particle pose are one-to-one associated with Ls perception vector elements in the N perception vector elements and a horizontal coordinate of an $h^{th}$ perception vector element in the Ls perception vector elements in the image coordinate system is less than a horizontal coordinate of an $(h+1)^{th}$ perception vector element in the Ls perception vector elements in the image coordinate system, a horizontal coordinate of a projection vector element associated with the $h^{th}$ perception vector element is less than a horizontal coordinate of a projection vector element associated with the $(h+1)^{th}$ perception vector element, and a difference between a horizontal coordinate of each of the Ls perception vector elements and a horizontal coordinate of an associated projection vector element is less than a preset threshold, wherein Ls is a positive integer less than or equal to M and less than or equal to N, and wherein h is a positive integer less than Ls;
calculating, based on the association result corresponding to each particle pose of the plurality of particle poses, projection errors between Ls projection vector elements corresponding to each particle pose and corresponding Ls perception vector elements, to obtain a plurality of projection errors that are in a one-to-one correspondence with the plurality of particle poses; and
determining a particle pose corresponding to a smallest projection error in the plurality of projection errors as the second particle pose.

6. The method according to claim 5, wherein the projection error corresponding to each particle pose is measured by a value of C in following relational expression:

$$C = -\frac{1}{Ls}\sum_{i=1}^{Ls} e_i + \omega Ls,$$

wherein ω is a preset parameter, wherein $e_i$ represents a difference between a horizontal coordinate of an $i^{th}$ projection vector element in the $L_s$ projection vector elements and a horizontal coordinate of an $i^{th}$ perception vector element in the $L_s$ perception vector elements, and wherein a larger value of C indicates a smaller projection error corresponding to each particle pose.

7. The method according to claim 1, further comprising:
extracting X perception vector elements from a second image captured by the image capture apparatus, wherein X is a positive integer; and
in response to that a timestamp of the second image is after a timestamp of an image corresponding to a perception vector element used for last filtering observation update, performing pose estimation on the mobile device based on the X perception vector elements by using a filtering observation update method; or performing pose estimation on the mobile device based on the X perception vector elements by using a local pose map optimization method.

8. The method according to claim 1, wherein the determining the association result of the N perception vector elements and the M first projection vector elements comprises:
arranging the N perception vector elements in ascending order of horizontal coordinates, to obtain a first sequence; and
performing following operations for each perception vector element in the first sequence from the first perception vector element to the last perception vector element in the first sequence: searching the M first projection vector elements for a first projection vector element that is of a same type as each perception vector element, having a minimum difference between a horizontal coordinate of the first projection vector element and the horizontal coordinate of each perception vector element, having a difference less than a specified threshold between the horizontal coordinate of the first projection vector element and the horizontal coordinate of each perception vector element, and having a horizontal coordinate greater than a horizontal coordinate of a first projection vector element associated with a perception vector element before each perception vector element, and associating the first projection vector element with each perception vector element.

9. An apparatus for positioning a mobile device, comprising:
at least one processor;
a memory storing instructions, which when executed by the at least one processor, causes the apparatus to:
extract N perception vector elements from a first image captured by an image capture apparatus of the mobile device, wherein N is a positive integer;
project, based on a first particle pose of the mobile device, M' map vector elements in a map into an image coordinate system of the image capture apparatus, to obtain M first projection vector elements that are in a one-to-one correspondence with M map vector elements in the M' map vector elements, wherein M' is a positive integer, and wherein M is a positive integer less than or equal to M';
determine an association result of the N perception vector elements and the M first projection vector elements, the association result comprising: when L perception vector elements in the N perception vector elements are one-to-one associated with L first projection vector elements in the M first projection vector elements, and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, L is an integer greater than 1, wherein L is less than or equal to a minimum value of M and N, wherein t is a positive integer less than L, and wherein each L perception vector element of the L perception vector elements and a corresponding first projection vector element are vector elements of a same type; and
perform pose estimation on the mobile device based on coordinates of each L perception vector element of the L perception vector elements and the corresponding first projection vector element, and the first particle pose.

10. The apparatus according to claim 9, wherein the instructions, which when executed by the at least one processor, further causes the apparatus to:
determine position errors between the L perception vector elements and the corresponding L first projection vector elements based on a difference between a horizontal coordinate of each L perception vector element of the L perception vector elements and the corresponding first projection vector element;
determine a weight of the first particle pose based on the position errors; and
perform pose estimation on the mobile device based on the weight of the first particle pose and the first particle pose.

11. The apparatus according to claim 10, wherein the difference between the horizontal coordinate of each of the L perception vector elements and the horizontal coordinate of the corresponding first projection vector element and the position errors meet following relational expression:

$$\text{error} = \frac{1}{L}\sum_{i=1}^{L}|u'_t - u_t|,$$

wherein
$u_t$ represents the horizontal coordinate of the $t^{th}$ perception vector element in the L perception vector elements, wherein $u_t'$ represents the horizontal coordinate of the first projection vector element corresponding to the $t^{th}$ perception vector element, and wherein error represents the position error.

12. The apparatus according to claim 9, wherein the instructions, which when executed by the at least one processor, further causes the apparatus to:
project, based on a second particle pose of the mobile device, the M' map vector elements into the image coordinate system, to obtain M second projection vector elements that are in a one-to-one correspondence with the M map vector elements in the M' map vector elements;
respectively select L second projection vector elements and the L perception vector elements from the M second projection vector elements and the N perception vector elements, to meet following relational expression, wherein the L second projection vector elements are one-to-one associated with the L perception vector elements:

$$\min\sum_{i=1}^{N}\sum_{j=1}^{M}\left\{e_{ij}x_{ij} + \omega\frac{1}{2N_i}\left(\sum_{k|x_k\in N_{x_i}\&\&p_k==1}d(y_j, y_{n_k}) + \sum_{k|y_k\in N_{y_j}}d(x_i, x_{m_k})\right)\right\}$$

$$\sum_{i=1}^{N}x_{ij} = 1$$

$$\sum_{j=1}^{M}x_{ij} \leq 1$$

$$x_{ij} = 0 \text{ or } 1$$

$$d(y_j, y_{n_k}) = \begin{cases} 0, n_k \in N_{y_j} \\ 1, n_k \notin N_{y_j} \end{cases}$$

$$d(x_i, x_{m_k}) = \begin{cases} 0, m_k \in N_{x_i} \\ 1, m_k \notin N_{x_i} \end{cases},$$

wherein

Wherein ω is a preset value, $e_{ij}$ represents a difference between a horizontal coordinate of an $i^{th}$ perception vector element in the N perception vector elements and a horizontal coordinate of a $j^{th}$ second projection vector element in the M second projection vector elements, wherein $x_{ij}$ represents whether the $i^{th}$ perception vector element is associated with the $j^{th}$ second projection vector element, wherein $N_i$ represents a quantity of perception vector elements adjacent to the $i^{th}$ perception vector element in the N perception vector elements, wherein $N_{x_i}$ represents a set of the perception vector elements adjacent to the $i^{th}$ perception vector element in the N perception vector elements, $x_k$ represents a $k^{th}$ perception vector element in the N perception vector elements, wherein $p_k$ represents whether an associated second projection vector element has been found for the $k^{th}$ perception vector element, wherein $n_k$ represents a second projection vector element that is in the M second projection vector elements and that matches the $k^{th}$ perception vector element, $d(y_j, y_{n_k})$ represents whether an adjacent relationship between the $i^{th}$ perception vector element and the $k^{th}$ perception vector element is the same as an adjacent relationship between the $j^{th}$ second projection vector element and the second projection vector element represented by $n_k$, wherein $N_{y_j}$ represents a set of second projection vector elements that are in the M second projection vector elements and that are adjacent to the $j^{th}$ second projection vector element, wherein $y_k$ represents a $k^{th}$ second projection vector element in the M second projection vector elements, wherein $m_k$ represents a perception vector element that is in the N perception vector elements and that is associated with the $k^{th}$ second projection vector element, and $d(x_i, x_{m_k})$ represents whether an adjacent relationship between the $j^{th}$ second projection vector element and the $k^{th}$ second projection vector element is the same as an adjacent relationship between the $i^{th}$ perception vector element and the perception vector element represented by $m_k$;

associate each L perception vector element of the L perception vector elements with a map vector element corresponding to an associated second projection vector element; and associate each L perception vector element of the L perception vector elements with a first projection vector element corresponding to the associated map vector element.

13. The apparatus according to claim 12, wherein instructions, which when executed by the at least one processor, further causes the apparatus to:

before projecting, based on the second particle pose of the mobile device, the M' map vector elements into the image coordinate system, to obtain the M second projection vector elements that are in the one-to-one correspondence with the M map vector elements in the M' map vector elements:

project the M' map vector elements into the image coordinate system based on each particle pose of a plurality of particle poses of the mobile device, to obtain M projection map vector elements corresponding to each particle pose;

associate the N perception vector elements with the M projection map vector elements corresponding to each of the plurality of particle poses, to obtain an association result corresponding to each particle pose, an association result corresponding to an $s^{th}$ particle pose in the plurality of particle poses comprising: when Ls projection vector elements in M projection map vector elements corresponding to the $s^{th}$ particle pose are one-to-one associated with Ls perception vector elements in the N perception vector elements and a horizontal coordinate of an $h^{th}$ perception vector element in the Ls perception vector elements in the image coordinate system is less than a horizontal coordinate of an $(h+1)^{th}$ perception vector element in the Ls perception vector elements in the image coordinate system, a horizontal coordinate of a projection vector element associated with the $h^{th}$ perception vector element is less than a horizontal coordinate of a projection vector element associated with the $(h+1)^{th}$ perception vector element, and a difference between a horizontal coordinate of each of the Ls perception vector elements and a horizontal coordinate of an associated projection vector element is less than a preset threshold, wherein Ls is a positive integer less than or equal to M and less than or equal to N, and wherein h is a positive integer less than Ls;

calculate, based on the association result corresponding to each particle pose of the plurality of particle poses, projection errors between Ls projection vector elements corresponding to each particle pose and corresponding Ls perception vector elements, to obtain a plurality of projection errors that are in a one-to-one correspondence with the plurality of particle poses; and determine a particle pose corresponding to a smallest projection error in the plurality of projection errors as the second particle pose.

14. The apparatus according to claim 13, wherein the projection error corresponding to each particle pose is measured by a value of C in following relational expression:

$$C = -\frac{1}{Ls}\sum_{i=1}^{Ls} e_i + \omega Ls,$$

wherein

ω is a preset parameter, wherein $e_i$ represents a difference between a horizontal coordinate of an $i^{th}$ projection vector element in the $L_s$ projection vector elements and a horizontal coordinate of an $i^{th}$ perception vector element in the $L_s$ perception vector elements, and wherein a larger value of C indicates a smaller projection error corresponding to each particle pose.

15. The apparatus according to claim 9, wherein the instructions, which when executed by the at least one processor, further causes the apparatus to: extract X perception vector elements from a second image captured by the image capture apparatus, wherein X is a positive integer; and in response to that a timestamp of the second image is after a timestamp of an image corresponding to a perception vector element used for last filtering observation update, perform pose estimation on the mobile device based on the X perception vector elements by using a filtering observation update method; or perform pose estimation on the mobile device based on the X perception vector elements by using a local pose map optimization method.

16. The apparatus according to claim 9, wherein the instructions, which when executed by the at least one processor, further causes the apparatus to:

arrange the N perception vector elements in ascending order of horizontal coordinates, to obtain a first sequence; and perform following operations for each perception vector element in the first sequence from the first perception vector element to the last perception vector element in the first sequence: searching the M first projection vector elements for a first projection vector element that is of a same type as each perception vector element, having a minimum difference between a horizontal coordinate of the first projection vector element and the horizontal coordinate of each perception vector element, having a difference less than a specified threshold between the horizontal coordinate of the first projection vector element and the horizontal coordinate of each perception vector element, and having a horizontal coordinate greater than a horizontal coordinate of a first projection vector element associated with a perception vector element before each perception vector element, and associating the first projection vector element with each perception vector element.

17. A non-transitory machine-readable medium having instructions stored therein, which when executed by a processor, cause the processor to:

extract N perception vector elements from a first image captured by an image capture apparatus of a mobile device, wherein N is a positive integer;

project, based on a first particle pose of the mobile device, M' map vector elements in a map into an image coordinate system of the image capture apparatus, to obtain M first projection vector elements that are in a one-to-one correspondence with M map vector elements in the M' map vector elements, wherein M' is a positive integer, and wherein M is a positive integer less than or equal to M';

determine an association result of the N perception vector elements and the M first projection vector elements, the association result comprising: when L perception vector elements in the N perception vector elements are one-to-one associated with L first projection vector elements in the M first projection vector elements and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, wherein L is an integer greater than 1, wherein L is less than or equal to a minimum value of M and N, wherein t is a positive integer less than L, and wherein each L perception vector element of the L perception vector elements and a corresponding first projection vector element are vector elements of a same type; and perform pose estimation on the mobile device based on coordinates of each L perception vector element of the L perception vector elements and the corresponding first projection vector element, and the first particle pose.

18. A chip comprising a processor and a data interface, and the processor is caused, when reading instructions stored in a memory through the data interface, to:

extract N perception vector elements from a first image captured by an image capture apparatus of a mobile device, wherein N is a positive integer;

project, based on a first particle pose of the mobile device, M' map vector elements in a map into an image coordinate system of the image capture apparatus, to obtain M first projection vector elements that are in a one-to-one correspondence with M map vector elements in the M' map vector elements, wherein M' is a positive integer, and wherein M is a positive integer less than or equal to M';

determine an association result of the N perception vector elements and the M first projection vector elements, the association result comprising: when L perception vector elements in the N perception vector elements are one-to-one associated with L first projection vector elements in the M first projection vector elements and a horizontal coordinate of a $t^{th}$ perception vector element in the L perception vector elements in the image coordinate system is less than a horizontal coordinate of a $(t+1)^{th}$ perception vector element in the L perception vector elements in the image coordinate system, a horizontal coordinate of a first projection vector element corresponding to the $t^{th}$ perception vector element is less than a horizontal coordinate of a first projection vector element corresponding to the $(t+1)^{th}$ perception vector element, wherein L is an integer greater than 1, wherein L is less than or equal to a minimum value of M and N, wherein t is a positive integer less than L, and wherein each L perception vector element of the L perception vector elements and a corresponding first projection vector element are vector elements of a same type; and perform pose estimation on the mobile device based on coordinates of each L perception vector element of the L perception vector elements and the corresponding first projection vector element, and the first particle pose.

* * * * *